United States Patent
Watanabe et al.

(10) Patent No.: US 7,134,985 B2
(45) Date of Patent: Nov. 14, 2006

(54) DOWNHILL SPEED CONTROLLER

(75) Inventors: Yutaka Watanabe, Ibaraki-ken (JP); Hiroshi Watanabe, Ushiku (JP); Yasushi Tokuda, Ibaraki-ken (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 160 days.

(21) Appl. No.: 10/504,818

(22) PCT Filed: Oct. 10, 2003

(86) PCT No.: PCT/JP03/13045

§ 371 (c)(1),
(2), (4) Date: Aug. 17, 2004

(87) PCT Pub. No.: WO2004/037623

PCT Pub. Date: May 6, 2004

(65) Prior Publication Data

US 2005/0096183 A1   May 5, 2005

(30) Foreign Application Priority Data

| Oct. 28, 2002 | (JP) | ............................. 2002-312095 |
| Oct. 28, 2002 | (JP) | ............................. 2002-312108 |
| Oct. 28, 2002 | (JP) | ............................. 2002-312112 |
| Oct. 28, 2002 | (JP) | ............................. 2002-312120 |

(51) Int. Cl.
B60W 10/04 (2006.01)

(52) U.S. Cl. ...................................... 477/186

(58) Field of Classification Search ................ 477/184, 477/186, 187; 303/192, 191; 180/170, 178, 180/167, 179

See application file for complete search history.

(56) References Cited

U.S. PATENT DOCUMENTS

| 4,485,444 | A | * | 11/1984 | Maruyama et al. ........... 701/97 |
| 5,238,080 | A | * | 8/1993 | Fastie ......................... 180/178 |
| 5,941,614 | A | * | 8/1999 | Gallery et al. .............. 303/192 |
| 5,957,552 | A | * | 9/1999 | Claussen et al. ............ 303/192 |
| 5,997,108 | A | * | 12/1999 | Claussen et al. ............ 303/192 |
| 6,299,263 | B1 | * | 10/2001 | Uematsu et al. ............ 303/192 |
| 7,000,722 | B1 | * | 2/2006 | Artis et al. .................. 180/170 |

FOREIGN PATENT DOCUMENTS

| JP | 6-135260 | 5/1994 |
| JP | 9-50597 | 2/1997 |
| JP | 10-258650 | 9/1998 |
| JP | 2001-265439 | 9/2001 |
| JP | 2002-89314 | 3/2002 |
| JP | 2002-225689 | 8/2002 |

* cited by examiner

Primary Examiner—Dirk Wright
(74) Attorney, Agent, or Firm—Mattingly, Stanger, Malur & Brundidge, P.C.

(57) ABSTRACT

The invention is intended to provide a downhill speed control system which employs a method of setting a target vehicle speed in advance, thereby improving controllability when a vehicle runs down a slope, and giving an operator improved operability in setting of the target vehicle speed. Brakes are controlled so that, when the vehicle runs down the slope, an actual vehicle speed is matched with a target speed set by a switch which can set the target speed by selectively or continuously changing plural preset speeds. Also, control constants for PID control are modified depending on settings of a downslope gradient setting switch and a load setting switch. When an acceleration computed from the actual vehicle speed is larger than a target acceleration, the strength of applied brake is increased.

26 Claims, 22 Drawing Sheets

FIG.6

|  | DOWNSLOPE GRADIENT (°) | | | | | | |
|---|---|---|---|---|---|---|---|
|  | 0 | 5 | 10 | 15 | 20 | 25 | 30 |
| LOAD (%) 0 | 0 | 35 | 40 | 45 | 50 | 60 | 70 |
| 20 | 0 | 40 | 45 | 50 | 55 | 65 | 75 |
| 40 | 0 | 45 | 50 | 55 | 60 | 70 | 80 |
| 60 | 0 | 50 | 55 | 60 | 65 | 75 | 85 |
| 80 | 0 | 55 | 60 | 65 | 70 | 80 | 90 |
| 100 | 0 | 65 | 70 | 75 | 80 | 90 | 100 |

DOWNHILL SPEED CONTROLLER

TECHNICAL FIELD

The present invention relates to a downhill speed control system for controlling a speed of a vehicle running down a slope, and more particularly to a downhill speed control system suitable for automatically controlling a downhill speed by properly applying the brake when a vehicle having a large loading capacity, such as a dump truck, runs down a slope.

BACKGROUND ART

A method of adjusting the strength of applied brake with an operator operating a foot brake or a brake lever has hitherto been practiced for the purpose of keeping a vehicle speed at a control target value when a vehicle runs down a slope. In mines or the likes where a downward slope continues over a long distance, however, it is troublesome for the operator to operate the brake whenever an occasion requires. In a downhill speed control system for releasing the operator from the troublesome braking operation in such a case, as disclosed in, e.g., JP-A-6-135260, a target vehicle speed is set depending on a road surface gradient angle detected by a road surface gradient sensor, and a retarder brake is controlled so that a vehicle speed detected by a vehicle speed sensor is held at the target vehicle speed. Further, the disclosed control system includes a loaded weight sensor, and the strength of the applied brake is controlled depending on the amount of earth and sand loaded in a vessel.

DISCLOSURE OF THE INVENTION

In the downhill speed control system disclosed in JP-A-6-135260, however, a target vehicle speed setting circuit sets the target speed depending on an output of the road surface gradient sensor, and the target speed is decreased when the gradient of a downward slope changes only after a vehicle has entered the downward slope. This has raised a first problem that, if the actual vehicle speed at the time when the vehicle has entered the downward slope differs much from that set by the target vehicle speed setting circuit, the control system may be brought into a control disabled state.

Also, when trying to detect parameters required in control for braking a vehicle running down a slope, such as a slope condition, a load and a gradient, as proposed in JP-A-6-135260, the system cost is necessarily increased. Further, a generally used inclinometer often causes errors under an influence of gravity. It is therefore very difficult to accurately determine the gradient of a slope surface with such an inclinometer during the running. In addition, the strength of brake to be applied while running down a slope varies depending on various factors, and the strength of the applied brake requires to be adjusted, for example, depending on whether the slope is unpaved or paved, and whether it is wetted or not. Stated another way, the strength of the applied brake must be changed flexibly in response to changes of those factors. For example, a slope over which a dump truck or the like runs down is generally unpaved, and irregularities (dips and bumps) exist on the road surface. With the control system utilizing the road surface gradient detected by the road surface gradient sensor as disclosed in JP-A-6-135260, when a tire of the dump truck comes into a dip, this is regarded as indicating that the road surface gradient has increased, and the target speed is decreased. Hence, the control is performed such that the dump truck is abruptly braked. Then, when the tire comes out of the dip, the applied brake is moderated so as to restore the preceding vehicle speed again. On the other hand, when a tire of the dump truck rides over a projection, this is regarded as indicating that the road surface gradient has decreased, and the target speed is increased. Hence, the control is performed such that the applied brake is moderated to accelerate the dump truck. Then, when the tire climbs over the projection, the brake is applied so as to restore the preceding vehicle speed again. This results in a second problem that the vehicle speed varies depending on irregularities of the road surface and the control becomes unstable.

Furthermore, with the downhill speed control system disclosed in JP-A-6-135260, in a steep slope, a dump truck is accelerated sometimes beyond the target speed even when an operator drives the dump truck to enter the slope at a low speed. In other words, a third problem resides in that, in a steep slope, speed changes are increased and the control becomes unstable.

A first object of the present invention is to provide a downhill speed control system in which a target vehicle speed is set in advance, thereby improving not only controllability when a vehicle runs down a slope, but also operability in setting of the target vehicle speed by an operator.

A second object of the present invention is to provide a downhill speed control system, which can modify setting depending on conditions of a downward slope and a load, and can improve controllability when a vehicle runs down the slope.

A third object of the present invention is to provide a downhill speed control system, which can improve stability in a downhill speed control when a vehicle runs down a slope.

In many of mines, slopes are constructed at a certain gradient and the number of running-down patterns is generally limited. Also, it is few that the condition of a slope surface changes greatly at least in one day. Therefore, once the strength of applied brake is adjusted for one downward slope, a vehicle is able to run down many other downward slopes in accordance with the adjusted strength of the applied brake in a repeated way. In view of the above, the present invention is constituted as follows:

(1) To achieve the above object, the present invention provides a downhill speed control system having control means for controlling the strength of applied brake to make an actual vehicle speed matched with a target speed when a vehicle runs down a slope, wherein the control system includes target speed setting means capable of setting the target speed, and the control means controls the strength of applied brake so that an actual vehicle speed is matched with a target speed set by the target speed setting means.

With that construction, the target speed can be set in advance, whereby it is possible to improve not only controllability when the vehicle runs down the slope, but also operability in setting of the target speed by an operator.

(2) In above (1), preferably, the target speed setting means includes a setting selection switch capable of selecting a plurality of target speeds set in advance.

(3) In above (1), preferably, the target speed setting means includes a setting speed switch capable of setting the target speed in a continuous way.

(4) In above (2) or (3), preferably, the target speed setting means includes an up/down switch capable of increasing and decreasing the target speed indicated on a display.

(5) In above (1), preferably, the control means monitors a step-down amount of an accelerator pedal and starts control of the strength of the applied brake when the step-down amount becomes zero.
(6) In above (1), preferably, the control means monitors a step-down amount of an accelerator pedal or a step-down amount of a brake pedal and varies a brake control amount depending on the step-down amount.
(7) In above (1), preferably, the downhill speed control system further comprises downslope gradient angle setting means capable of changeably setting a gradient angle of a downward slope, wherein the control means modifies at least one control constant for PID control, which is executed on a difference between the target speed and the actual speed, depending on the gradient angle set by the downslope gradient angle setting means, thereby controlling the strength of the applied brake.

By thus using the downslope gradient angle setting means to set the downslope gradient angle, an expensive inclinometer is no longer required.
(8) In above (1), preferably, the downhill speed control system further comprises load setting means capable of changeably setting a load carried on a vehicle, wherein the control means modifies at least one control constant for PID control, which is executed on a difference between the target speed and the actual speed, depending on the load set by the load setting means, thereby controlling the strength of the applied brake.

By thus using the load setting means to set the load, an expensive load sensor is no longer required.
(9) In above (7), preferably, the control means adds an offset output value, which is supplied to a solenoid proportional valve for driving each brake, to a value computed with the PID control depending on the gradient angle set by the downslope gradient angle setting means, thereby controlling the strength of the applied brake.
(10) In above (8), preferably, the control means adds the offset output value, which is supplied to the solenoid proportional valve for driving each brake, to a value computed with the PID control depending on the load set by the load setting means, thereby controlling the strength of the applied brake.
(11) In above (1), preferably, the control means computes an acceleration based on the actual vehicle speed, and performs control to increase the strength of the applied brake when the computed acceleration is larger than a target acceleration set in advance.

By thus increasing the strength of the applied brake when the computed acceleration is larger than the target acceleration, it is possible to avoid an abrupt acceleration, to prevent the actual speed from overshooting beyond the target speed, and to improve stability in the running-down speed control when the vehicle runs down the slope.
(12) In above (1), preferably, the control means has means for executing controls including proportional control to control the strength of the applied brake depending on a difference between the actual vehicle speed and the target speed when the vehicle runs down the slope, and a proportional constant for use in the proportional control executed by the control means is increased when the computed acceleration is larger than the target acceleration set in advance.
(13) In above (1), preferably, the control means sets control parameters corresponding to a previously taught condition of a downward slope and controls the strength of the applied brake in accordance with the set control parameters.

In many of mines, slopes are constructed at a certain gradient and the number of running-down patterns is generally limited. Also, it is few that the condition of a slope surface changes greatly at least in one day. Therefore, once the strength of the applied brake is adjusted for one slope, a vehicle is able to run down many other slopes in accordance with the adjusted strength of the applied brake in a repeated way. Thus, by setting the control parameters and controlling the strength of the applied brake corresponding to the previously taught condition of the downward slope, the target speed is held constant in spite of changes in the road surface condition caused by, e.g., irregularities of the road surface. As a result, it is possible to stabilize control and to improve controllability.
(14) In above (13), preferably, the downhill speed control system further comprises a setting unit for setting the condition of the downward slope, and a distance sensor for detecting the distance from a slope start point of the downward slope, wherein the control means holds the condition of the downward slope, which has been set and taught by the setting unit in advance, in correspondence with the distance from the slope start point detected by the distance sensor, and while reproducing the condition of the downward slope held in correspondence with the distance from the slope start point detected by the distance sensor, the control means sets the control parameters corresponding to the reproduced condition of the downward slope, thereby controlling the strength of the applied brake in accordance with the set control parameters.
(15) In above (13), preferably, the downhill speed control system further comprises a condition detecting sensor for detecting the condition of the downward slope, and a distance sensor for detecting the distance from a slope start point of the downward slope, wherein the control means holds the condition of the downward slope, which has been set and taught by the condition detecting sensor in advance, in correspondence with the distance from the slope start point detected by the distance sensor, and while reproducing the condition of the downward slope held in correspondence with the distance from the slope start point detected by the distance sensor, the control means sets the control parameters corresponding to the reproduced condition of the downward slope, thereby controlling the strength of the applied brake in accordance with the set control parameters.
(16) In above (13), preferably, the downhill speed control system further comprises a condition detecting sensor for detecting the condition of the downward slope, and a position sensor for detecting a position in the course of the downward slope, wherein the control means holds the condition of the downward slope, which has been set and taught by the condition detecting sensor in advance, in correspondence with the position in the course of the downward slope detected by the position sensor, and while reproducing the condition of the downward slope held in correspondence with the position in the course of the downward slope detected by the position sensor, the control means sets the control parameters corresponding to the reproduced condition of the downward slope, thereby controlling the strength of the applied brake in accordance with the set control parameters.
(17) In above (13), preferably, the downhill speed control system further comprises a receiver for receiving the condition of the downward slope from a road marker which transmits the condition of the downward slope, wherein the control means receives, by the receiver, the condition of the downward slope, which has been set and taught in the road marker in advance, and sets the control parameters corresponding to the received condition of the downward slope, thereby controlling the strength of the applied brake in accordance with the set control parameters.

(18) In above (13), preferably, the condition of the downward slope is a steering angle in the downward slope, and the control means sets the target speed as one of the control parameters corresponding to the steering angle in the downward slope, thereby controlling the strength of the applied brake so that a downhill speed is matched with the set target speed.

(19) In above (13), preferably, the condition of the downward slope is a gradient angle of the downward slope, and the control means sets a control constant as one of the control parameters corresponding to the gradient angle of the downward slope, thereby controlling the strength of the applied brake.

(20) In above (13), preferably, the condition of the downward slope is a gradient angle of the downward slope, and the control means sets an offset output value for a proportional valve, as one of the control parameters, corresponding to the gradient angle of the downward slope, thereby controlling the strength of the applied brake.

BRIEF DESCRIPTION OF THE DRAWINGS

FIG. 6 is an explanatory view of a two-dimensional map showing, by way of example, an integral constant K1.

BEST MODE FOR CARRYING OUT THE INVENTION

The configuration and operation of a downhill speed control system according to a first embodiment of the present invention will be described below with reference to FIGS. 1 to 3. In this embodiment, the present invention is applied to a dump truck.

Figure 1:
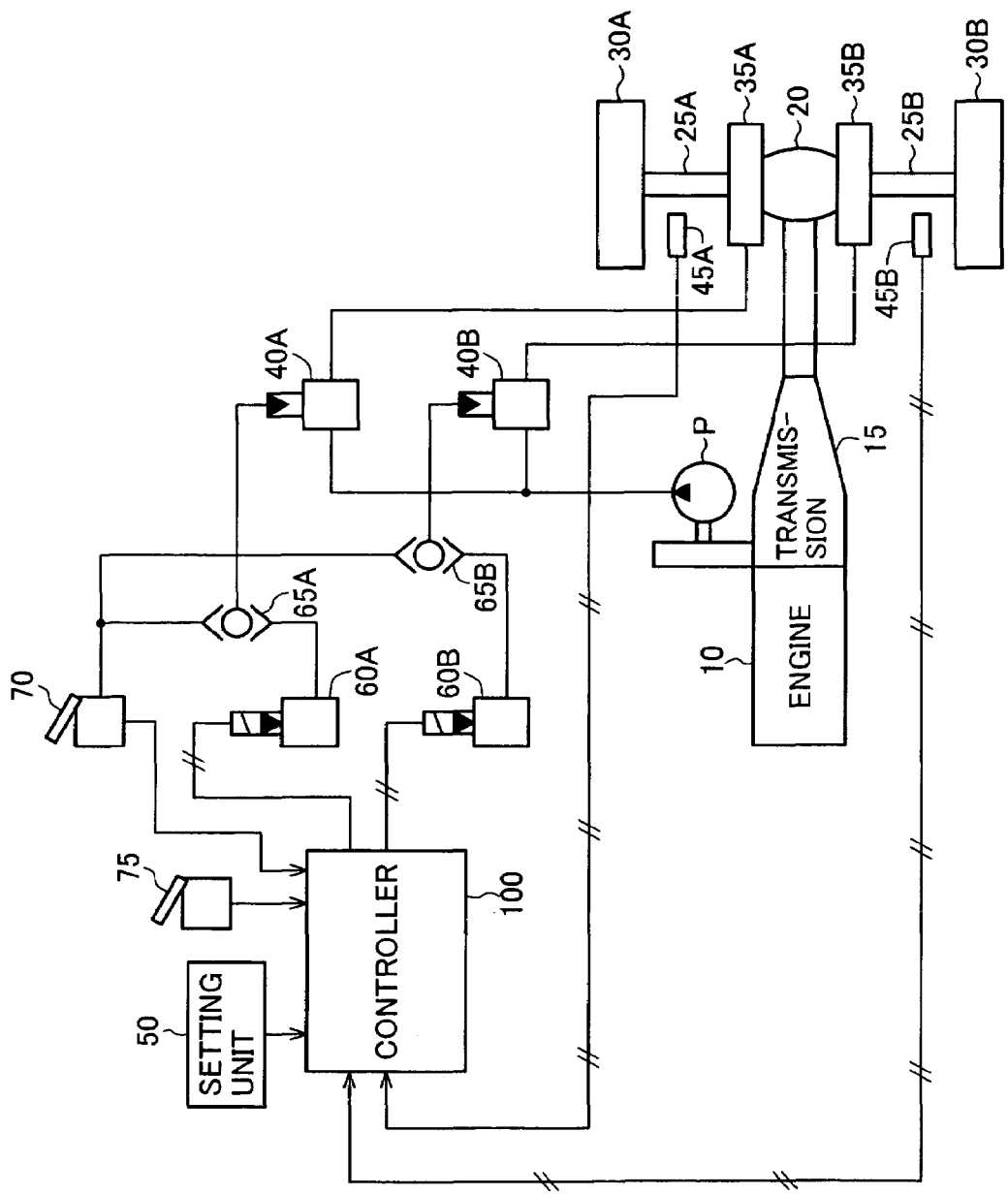
FIG. 1 is a block diagram showing the system configuration of a dump truck employing a downhill speed control system according to a first embodiment of the present invention.

FIG. 1 is a block diagram showing the system configuration of the dump truck employing the downhill speed control system according to the first embodiment of the present invention.

A driving force produced by an engine 10 is transmitted to two drive wheels 30A, 30B through a transmission 15, a differential gear 20 and axles 25A, 25B, thereby running a body of the dump truck. Retarder brakes 35A, 35B for applying braking forces to the drive wheels 30A, 30B are attached respectively to the axles 25A, 25B. Hydraulic pressures are supplied to the retarder brakes 35A, 35B through brake valves 40A, 40B from a pump P driven by the engine 10.

Vehicle speed sensors 45A, 45B for detecting wheel rotation speeds are disposed respectively in association with the drive wheels 30A, 30B. Vehicle speed data detected by the vehicle speed sensors 45A, 45B is inputted to a controller 100. A setting unit 50 is used for setting a target vehicle speed and its details will be described later with reference to FIG. 2. The controller 100 outputs control signals to solenoid proportional valves 60A, 60B so that vehicle speeds detected by the vehicle speed sensors 45A, 45B are matched with the target vehicle speed set by the setting unit 50. The solenoid proportional valves 60A, 60B are connected respectively to the brake valves 40A, 40B through shuttle valves 65A, 65B to control the brake valves 40A, 40B, thereby controlling respective braking forces produced by the retarder brakes 35A, 35B. As a result, the vehicle speed is controlled to be matched with the target vehicle speed. In addition, a signal from an accelerator pedal 75 is inputted to the controller 100. When the accelerator pedal 75 comes into a state not stepped down, i.e., when the accelerator pedal comes into a released state, the controller 100 determines such a state as indicating that the vehicle has entered a downward slope, and starts the control of the retarder brakes described above.

Further, a brake pedal 70 is connected to the shuttle valves 65A, 65B. Each of the shuttle valves 65A, 65B selects higher one of the pressure applied from the brake pedal 70 and the pressure applied from the corresponding solenoid proportional valve 60A, 60B, and transmits the selected pressure to the corresponding brake valve 40A, 40B. The retarder brakes 35A, 35B are usually automatically controlled by the controller 100. However, when an operator of the dump truck steps down the brake pedal 70, the retarder brakes 35A, 35B are operated so as to stop or decelerate a body of the dump truck in response to the intent of the operator.

Figure 2:
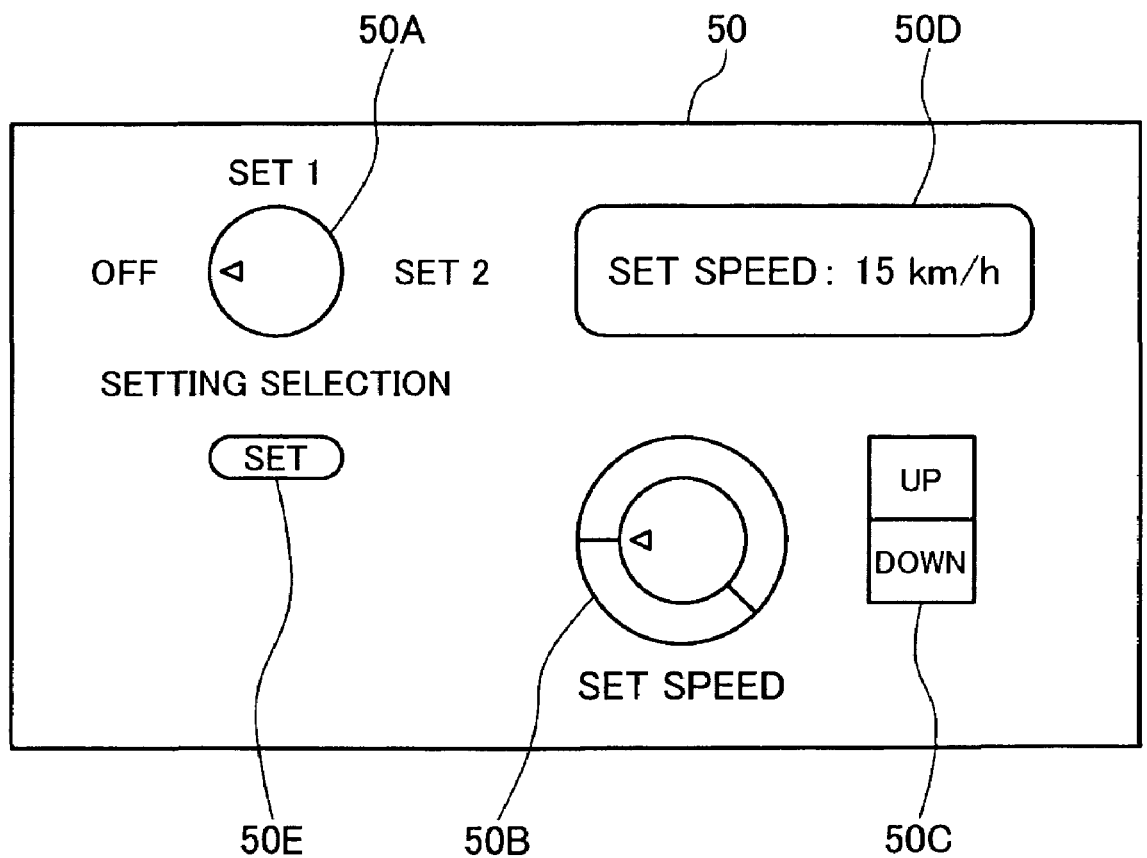
FIG. 2 shows the configuration of a setting unit used in the downhill speed control system according to the first embodiment of the present invention.

FIG. 2 shows the configuration of the setting unit used in the downhill speed control system according to the first embodiment of the present invention.

The setting unit 50 has a set speed selection switch 50A, a speed setting switch 50B, an up/down switch 50C, a display 50D, and a set switch 50E. The set speed selection switch 50A is in the form of a rotary switch or the like, and it can be shifted, for example, among three states, i.e., an OFF state, a SET1 state, and a SET2 sate. When the set speed selection switch 50A is rotated to select the SET1 state, a preset speed (e.g., 15 km/h) is indicated on the display 50D. When the set speed selection switch 50A is rotated to select the SET2 state, another preset speed (e.g., 10 km/h) is indicated on the display 50D.

The speed setting switch 50B is also in the form of a rotary switch or the like, and it can change a target downhill speed in a continuously variable manner. When the speed setting switch 50B is rotated, the set speed indicated on the display 50D changes continuously in the order of, e.g., 10 km/h, 11 km/h, 12 km/h and so on. By depressing the set switch 50E in a state in which 12 km/h is indicated, for example, the downhill speed is set to the target speed of 12 km/h.

The up/down switch 50C is a switch for incrementing or decrementing the set speed indicated on the display 50D. For example, by depressing the up/down switch 50C on the up-side in a state in which the set speed of 12 km/h is indicated on the display 50D, the set speed indicated on the display 50D is changed successively in the order of 13 km/h, 14 km/h, 15 km/h and so on. Likewise, by depressing the up/down switch 50C on the down-side in a state in which the set speed of 12 km/h is indicated on the display 50D, for example, the set speed indicated on the display 50D is changed successively in the order of 12 km/h, 11 km/h, 10 km/h and so on. Then, by depressing the set switch 50E in a state in which 10 km/h is indicated, for example, the downhill speed is set to the target speed of 10 km/h.

In such a manner, the setting speed can be easily set by operating the set speed selection switch 50A, the speed setting switch 50B, or the up/down switch 50C. The data set by the setting unit 50 is read into the controller 100.

When the target speed is set depending on the gradient of a slope, it is also possible to simply set the target speed by selecting one of the SET1 state and the SET2 state with the set speed selection switch 50A. Further, when the target speeds having been set as SET1 and SET2 are not proper values, any other desired target speed can be easily set by operating the speed setting switch 50B or the up/down switch 50C.

Figure 3:
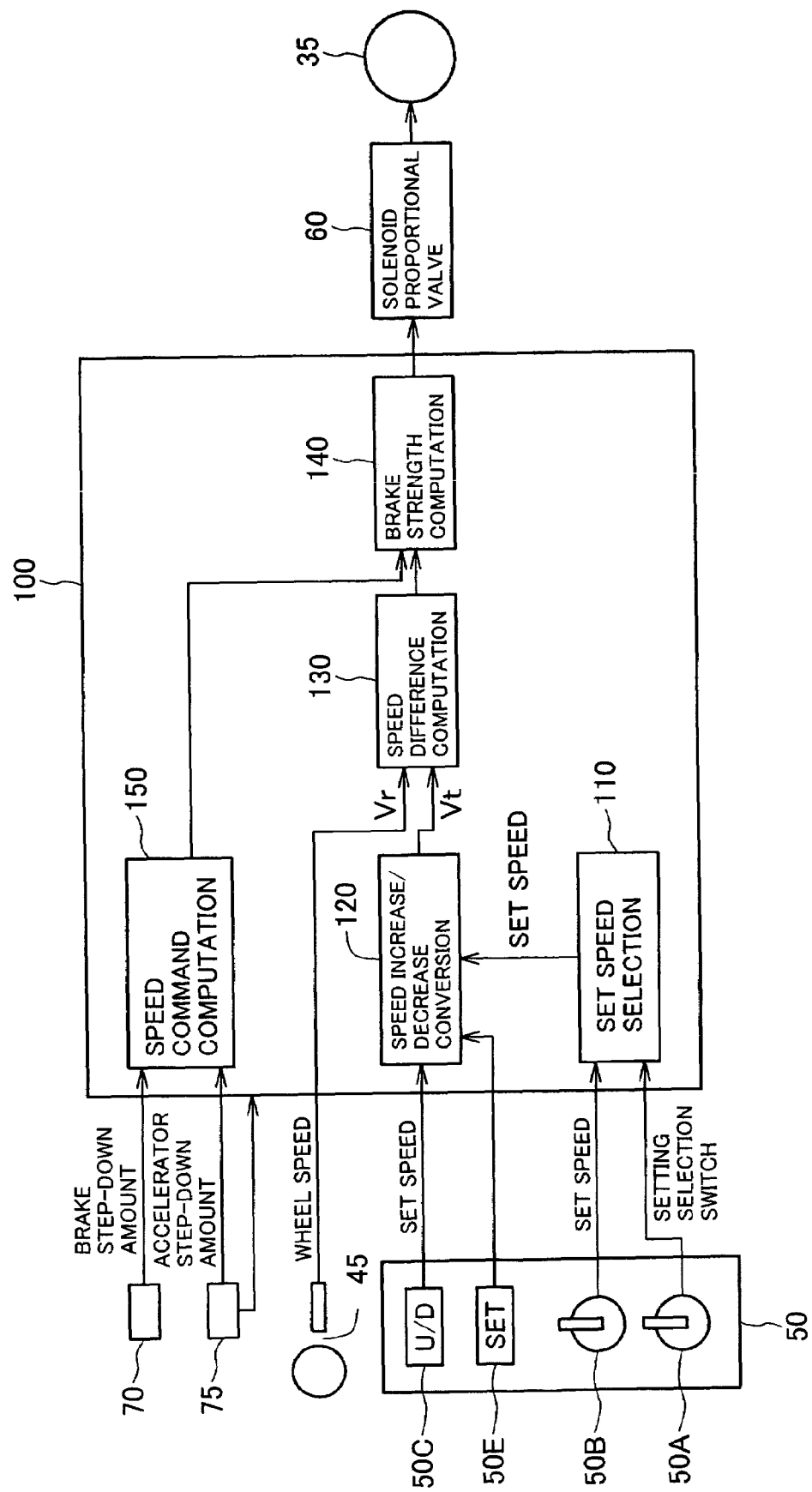
FIG. 3 is a system block diagram showing the configuration of the downhill speed control system according to the first embodiment of the present invention.

FIG. 3 is a system block diagram showing the configuration of the downhill speed control system according to the first embodiment of the present invention.

The controller 100 comprises a set speed selection means 110, a speed increase/decrease conversion means 120, a speed difference control means 130, a brake strength control means 140, and a speed command control means 150.

The set speed selection means 110 selects the target speed set by the set speed selection switch 50A or the speed setting switch 50B of the setting unit 50. The selected result is indicated on the display 50D shown in FIG. 2. The speed increase/decrease conversion means 120 increases or decreases the target speed selected by the set speed selection means 110 in response to operation of the up/down switch 50C of the setting unit 50. The increased or decreased result is indicated on the display 50D shown in FIG. 2. Further, when the set switch 50E of the setting unit 50 is depressed, the speed set at that time is outputted as the target speed to the speed difference control means 130.

Inputted to the speed difference control means 130 are the target speed outputted from the speed increase/-decrease conversion means 120 and the vehicle speed data detected by the vehicle speed sensor 45. The speed difference control means 130 computes a difference $\Delta V$ between target speed data Vt and an actual vehicle speed Vr detected by the vehicle speed sensor 45, and then outputs it to the brake strength control means 140. In accordance with the difference $\Delta V$, the brake strength control means 140 outputs a control signal to the solenoid proportional valve 60 and controls the retarder brake 35 so that the actual vehicle speed Vr is matched with the target speed Vt. Although, in this embodiment, two systems of sensors and actuators comprising the vehicle speed sensors 45A, 45B and the solenoid proportional valves 60A, 60B are disposed respectively in association with the left and right wheels as shown in FIG. 1, the example shown in FIG. 3 illustrates only one of those two systems of sensors and actuators. In fact, the speed difference control means 130 and the brake strength control means 140 are disposed corresponding to those two systems.

The speed command control means 150 receives, from the brake pedal 70, a signal representing the step-down amount of the brake pedal, and from the accelerator pedal 75, a signal representing the step-down amount of the accelerator pedal. When the brake pedal 70 is stepped down, the speed command control means 150 outputs, to the brake strength control means 140, a speed command signal for decreasing the target speed depending on the step-down amount of the brake. In response to outputting of the speed command for decreasing the target speed from the speed command control means 150, the brake strength control means 140 outputs, to the solenoid proportional valve 60, a signal representing the strength of brake to be applied, which has been increased in accordance with a value of the speed command. Also, when the accelerator pedal 75 is stepped down, the speed command control means 150 outputs, to the brake strength control means 140, a speed command signal for increasing the target speed depending on the step-down amount of the accelerator pedal. In response to outputting of the speed command for increasing the target speed from the speed command control means 150, the brake strength control means 140 outputs, to the solenoid proportional valve 60, a signal representing the strength of brake to be applied, which has been reduced in accordance with a value of the speed command. Stated another way, when neither the brake pedal 70 nor the accelerator pedal 75 is stepped down, the brake strength control means 140 outputs the control signal to the solenoid proportional valve 60 and automatically controls the retarder brake 35 in accordance with the difference $\Delta V$ between the target speed data Vt outputted from the speed difference control means 130 and the actual vehicle speed Vr detected by the vehicle speed sensor 45 so that the actual vehicle speed Vr is matched with the target speed Vt. However, when the brake pedal 70, for example, is stepped down during the automatic control mentioned above, this is regarded as indicating that the operator of the dump truck has an intent to further decrease the vehicle speed. To reflect that intent of the operator, therefore, the automatic control executed in the controller 100 is modified so as to automatically increase the strength of the applied brake. Also, when the accelerator pedal 75, for example, is stepped down during the automatic control mentioned above, this is regarded as indicating that the operator of the dump truck has an intent to increase the vehicle speed. To reflect that intent of the operator, therefore, the automatic control executed in the controller 100 is modified so as to automatically reduce the strength of the applied brake.

Further, as shown, the signal from the accelerator pedal 75 is supplied to the controller 100. Then, when the step-down amount of the accelerator pedal becomes zero, i.e., when the operator of the dump truck moves his foot away from the accelerator pedal, the controller 100 determines such a state as indicating that the vehicle has entered a downward slope, and starts the above-mentioned automatic control for the strength of the applied brake.

In the illustrated embodiment, the automatic control is performed so as to automatically reduce the strength of the applied brake when the accelerator pedal 75 is stepped down. However, the automatic control for the strength of the applied brake may be stopped when the accelerator pedal is stepped down, because the stepping-down of the accelerator pedal can be determined as indicating, for example, that running-down over a slope is finished and the vehicle has entered a flat road.

Also, in the embodiment described above, the brake strength control means 140 operates so as to increase the strength of the applied brake depending on the step-down amount of the brake pedal 70 and to reduce the strength of the applied brake depending on the step-down amount of the accelerator pedal 75. As an alternative, the strength of the applied brake may be increased or reduced by a certain amount regardless of the step-down amount of the brake pedal 70 or the step-down amount of the accelerator pedal 75.

Thus, with the operator setting the target speed using the setting unit 50, the retarder brakes 35 are controlled so that the set target speed is obtained. For example, the operator of the dump truck can easily set the target speed by operating the setting unit before entering a downward slope. According to the control system disclosed in JP-A-6-135260, the target vehicle speed setting circuit sets the target speed depending on an output of the road surface gradient sensor, and the target speed is decreased when the gradient angle of a downward slope changes only after a vehicle has entered the downward slope. Therefore, if the actual vehicle speed at the time when the vehicle has entered the downward slope differs much from that set by the target vehicle speed setting circuit, the control system may be brought into a control disabled state. In contrast, in this embodiment, the control system can be avoided from coming into a control disable state because the operator can set the target speed by operating the setting unit before entering the downward slope.

Also, when setting the target speed depending on the gradient of the downward slope, the operator can simply set the target speed by selecting one of the SET1 state and the SET2 state with the set speed selection switch 50A. Further, when the target speeds having been set as SET1 and SET2 are not proper values, any other desired target speed can be easily set by operating the speed setting switch 50B or the up/down switch 50C.

According to this embodiment, as described above, since the target speed can be set in advance before the vehicle enters a downward slope, it is possible to avoid the control system from coming into the control disable state, and to improve controllability while the vehicle is running down the slope. In addition, the target speed can be easily set by using the setting unit.

The configuration and operation of a downhill speed control system according to a second embodiment of the present invention will be described below with reference to FIGS. 1 and 4 to 7. In this embodiment, the present invention is applied to a dump truck.

The system configuration of the dump truck employing the downhill speed control system according to this embodiment is the same as that shown in FIG. 1.

Figure 4:
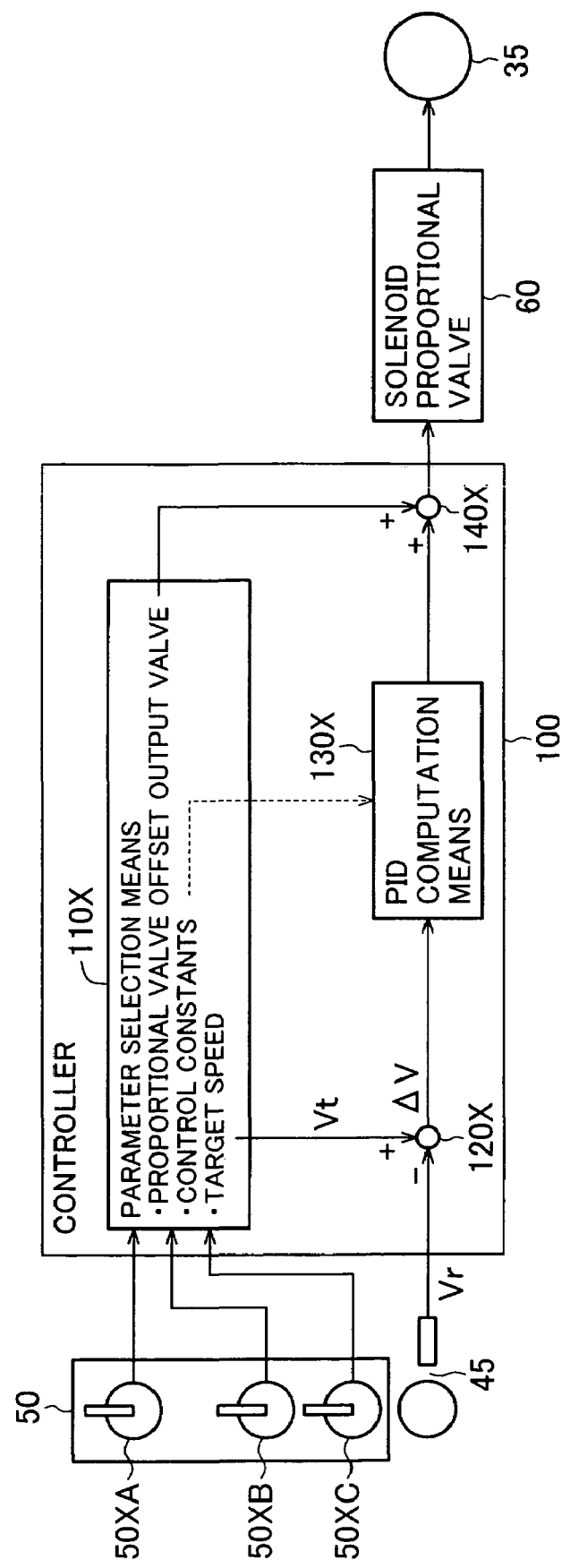
FIG. 4 is a system block diagram showing the configuration of a downhill speed control system according to a second embodiment of the present invention.

FIG. 4 is a system block diagram showing the configuration of the downhill speed control system according to the second embodiment of the present invention.

A setting unit 50 has a target speed setting switch 50XA, a downslope gradient angle setting switch 50XB, and a load setting switch 50XC. These setting switches 50XA, 50XB and 50XC are each in the form of a rotary switch or the like, which can set a setting value while changing it in a stepwise way. The target speed setting switch 50XA is a switch operated by the operator for changeably setting the speed running down a slope. The setting switch 50XA is able to select and set one of three target speeds, for example, 10 km/h, 12 km/h and 15 km/h. The downslope gradient angle setting switch 50XB is a switch operated by the operator for changeably setting a gradient angle of a downward slope by visually determining the gradient of the downward slope before entering it. The setting switch 50XB is able to select and set one of seven downslope gradient angles, for example, 0°, 5°, 10°, 15°, 20°, 25° and 30°. The load setting switch 50XC is a switch operated by the operator for changeably setting a current load as percentage (%) with respect to the maximum loading capacity by visually determining the weight of matters under carrying, e.g., earth and sand, loaded in a vessel of the dump truck. The setting switch 50XC is able to select and set one of six load percentages, e.g., 0%, 20%, 40%, 60%, 80% and 100%. The data set by the setting switches 50XA, 50XB and 50XC is read by a parameter selection means 110X in the controller 100.

The controller 100 comprises the parameter selection means 110X, a subtraction means 120X, a PID control means 130X, and an addition means 140X. The parameter selection means 110X reads the setting status of the target speed setting switch 50XA and then outputs, to the subtraction means 120X, target speed data corresponding to the switch setting status at that time. The subtraction means 120X computes a difference $\Delta V$ between target speed data Vt outputted from the parameter selection means 110X and an actual vehicle speed Vr detected by the vehicle speed sensor 45, and then outputs it to the PID control means 130X. In accordance with the output $\Delta V$ of the subtraction means 120X, the PID control means 130X outputs a control signal to the solenoid proportional valve 60 through the addition means 140X so that the actual vehicle speed Vr is matched with the target speed Vt. Although, in this embodiment, two systems of sensors and actuators comprising the vehicle speed sensors 45A, 45B and the solenoid proportional valves 60A, 60B are disposed respectively in association with the left and right wheels as shown in FIG. 1, the example shown in FIG. 4 illustrates only one of those two systems of sensors and actuators. In fact, the parameter selection means 110X and the PID control means 130X are disposed corresponding to those two systems.

Further, the parameter selection means 110X reads the respective setting statuses of the downslope gradient angle setting switch 50XB and the load setting switch 50XC, and then outputs, to the PID control means 130X, control constants for the PID control corresponding to the downslope gradient angle and the load which depend on the switch statuses set at that time.

Figure 5:
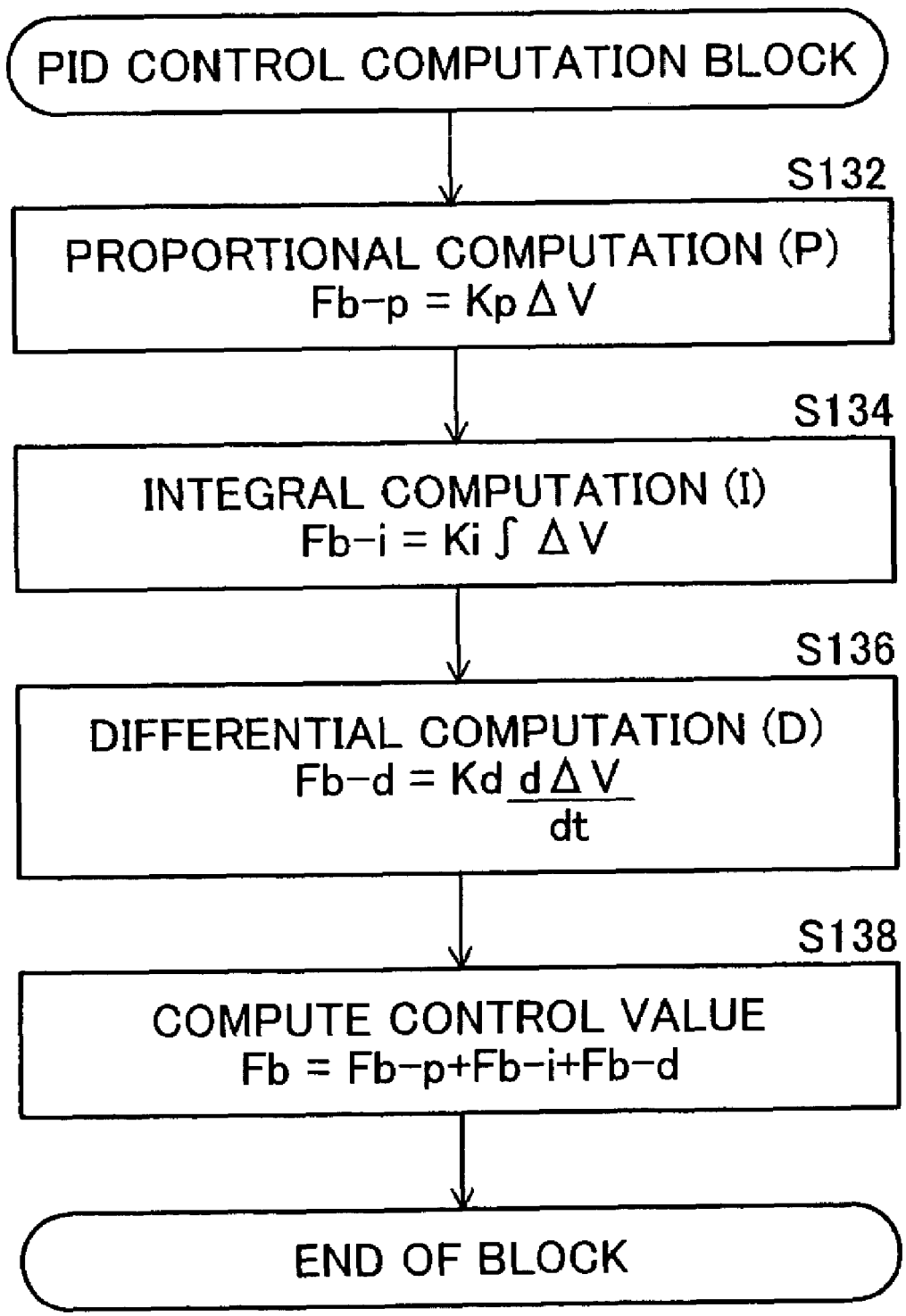
FIG. 5 is a flowchart showing details of PID arithmetic processing.

The PID control means 130X executes arithmetic processing shown in FIG. 5. More specifically, in proportional control, a proportional control value Fb-p is computed by multiplying a proportional constant Kp by the difference $\Delta V$ between the target speed data Vt and the actual vehicle speed Vr, the difference $\Delta V$ being inputted from the subtraction means 120X (step S132). In integral control, an integral control value Fb-i is computed by multiplying an integral constant Ki by an integral value of the difference $\Delta V$ between the target speed data Vt and the actual vehicle speed Vr, the difference $\Delta V$ being inputted from the subtraction means 120X (step S134). In differential control, a differential control value Fb-d is computed by multiplying a differential constant Kd by a differential value of the difference $\Delta V$ between the target speed data Vt and the actual vehicle speed Vr, the difference $\Delta V$ being inputted from the subtraction means 120X (step S136). Then, the computed control values (i.e., the proportional control value Fb-p, the integral control value Fb-i, and the differential control value Fb-d) are added together to obtain a PID control value Fb. In FIG. 4, one of the control constants outputted from the parameter selection means 110X is the integral constant Ki. The integral constant Ki is modified depending on the downslope gradient angle and the load.

FIG. 6 is a map showing, by way of example, the integral constant Ki. This integral constant map is a two-dimensional map in which the horizontal axis represents the downslope gradient angle and the vertical axis represents the load.

When the integral constant Ki is "100", the brake is applied at a maximum strength. Accordingly, when the downslope gradient angle is 30° and the load is 100% (i.e., the maximum load), the integral constant Ki is given as "100". Assuming, for example, that the integral constant Ki is "35" when the downslope gradient angle is 5° and the load is 0%, the integral constant Ki is set in advance such that the integral constant Ki is increased as the downslope gradient angle increases and it is also increased as the load increases, thereby increasing the strength of the applied brake.

The parameter selection means 110X shown in FIG. 4 includes the integral constant map shown in FIG. 6. The parameter selection means 110X reads the integral constant Ki for the PID control out of the integral constant map, which corresponds to the respective setting statuses of the downslope gradient angle setting switch 50XB and the load setting switch 50XC, and then outputs the read integral constant Ki to the PID control means 130X.

Further, the parameter selection means 110X reads the respective setting statuses of the downslope gradient angle setting switch 50XB and the load setting switch 50XC, and then outputs, to the addition means 140X, a proportional valve offset value corresponding to the downslope gradient angle and the load which depend on the switch statuses set at that time. The proportional valve offset value corresponds to the strength of the applied brake and serves as a factor for improving convergence when feedback control is performed so that the actual speed is matched with the predetermined target set speed. The proportional valve offset value is determined from a two-dimensional proportional valve offset value map in which the horizontal axis represents the downslope gradient angle and the vertical axis represents the load, as in the integral constant map shown in FIG. 6. The proportional valve offset value is thus set in advance such that the proportional valve offset value is increased as the downslope gradient angle increases and it is also increased as the load increases, thereby increasing the strength of the applied brake.

The parameter selection means 110X shown in FIG. 4 includes the proportional valve offset value map similar to the integral constant map shown in FIG. 6. The parameter selection means 110X reads the proportional valve offset value out of the proportional valve offset value map, which corresponds to the respective setting statuses of the downslope gradient angle setting switch 50XB and the load setting switch 50XC, and then outputs the read proportional valve offset value to the addition means 140X. The addition means 140X adds the output of the PID control means 130X and the proportional valve offset value outputted from the parameter selection means 110X. The addition result is outputted to the solenoid proportional valve 60 to control the braking force produced by the retarder brake 35.

Thus, with the operator setting the target speed setting switch 50XA, the downslope gradient angle setting switch 50XB, and the load setting switch 50XC of the setting unit 50, the retarder brakes 35 are controlled so that the set target speed is obtained. For example, the operator of the dump truck can easily set the target speed by operating the target speed setting switch 50XA before entering a downward slope. According to the control system disclosed in JP-A-6-135260, the target vehicle speed setting circuit sets the target speed depending on an output of the road surface gradient sensor, and the target speed is decreased when the gradient angle of a downward slope changes only after a vehicle has entered the downward slope. Therefore, if the actual vehicle speed at the time when the vehicle has entered the downward slope differs much from that set by the target vehicle speed setting circuit, the control system may be brought into a control disabled state. In contrast, in this embodiment, the control system can be avoided from coming into a control disable state because the operator can set the target speed by operating the setting unit before entering the downward slope.

Generally, in places such as mining sites where large-sized dump trucks are employed, slopes are designed to have a certain downslope gradient angle, and the operator of the dump truck is notified of information regarding the designed gradient angle in advance. According to this embodiment, as described above, since the operator can easily set the downslope gradient angle by operating the downslope gradient angle setting switch 50XB, it is possible to easily set and change the gradient angle without the downslope inclinometer. Further, since the gradient angle is set by operating the downslope gradient angle setting switch, the gradient angle is regarded as being the same and the target speed is held at the set value so long as the setting is not changed. Hence, the control is avoided from coming into an unstable state due to irregularities of the road surface.

Additionally, the control system can be constructed at a lower cost because of no need of both the inclinometer and the load sensor.

A parameter setting process executed in the controller 100 will be described below with reference to FIG. 7.

Figure 7:
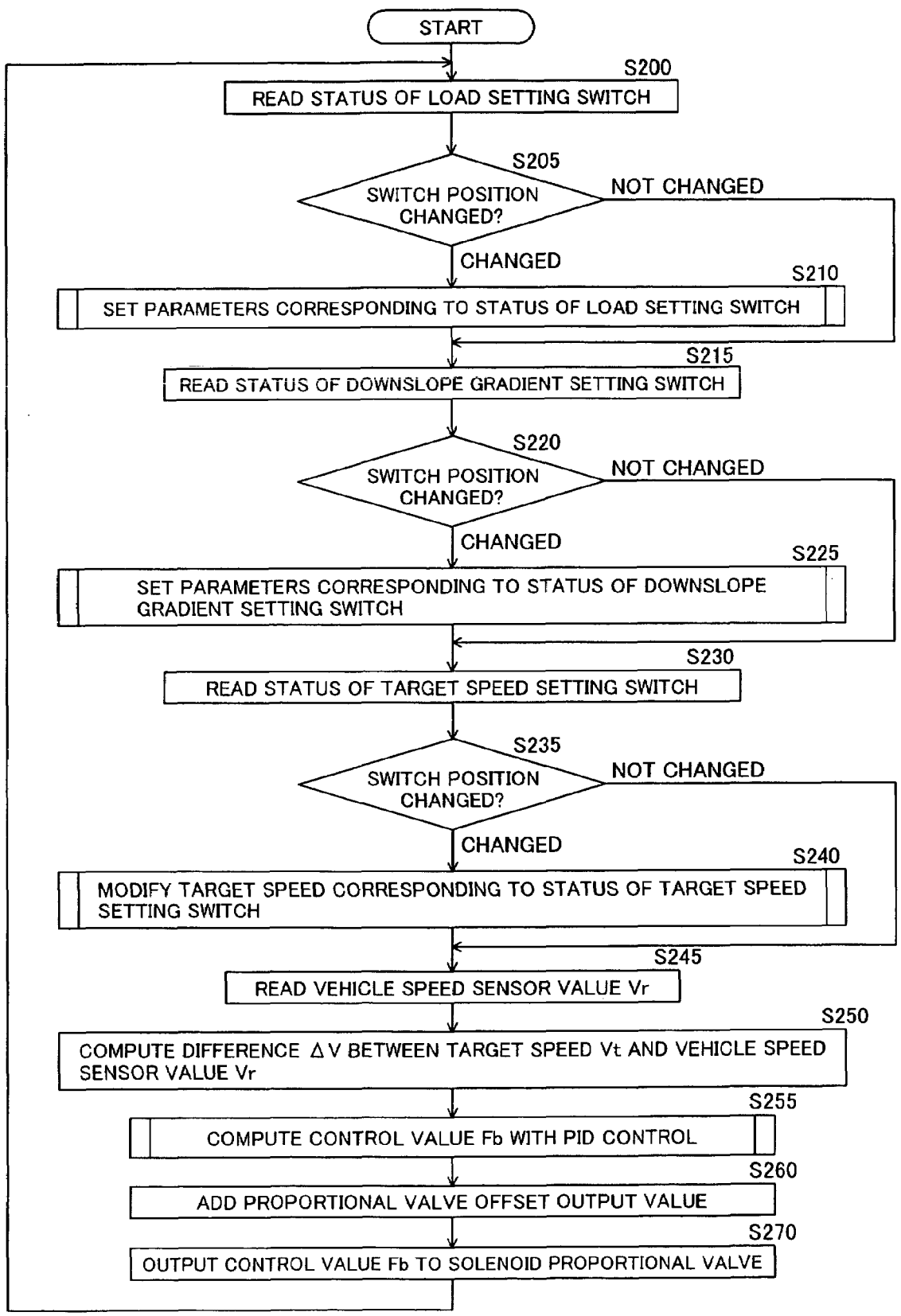
FIG. 7 is a flowchart showing details of a parameter setting process executed in a controller 100 according to the second embodiment of the present invention.

Referring to FIG. 7, the controller first reads the status of the load setting switch 50XC of the setting unit 50 (step S200). Then, it determines whether the switch position is changed or not (step S205), followed by proceeding to step S210 if the switch position is changed, or jumping to step S215 if not changed.

If the position of the load setting switch 50XC is changed, the parameters for the integral constant Ki, i.e., the control constant, and the proportional valve offset value are set corresponding to the status of the load setting switch 50XC and are outputted to the PID control means 130X and the addition means 140X (step S210).

Then, the controller reads the status of the downslope gradient angle setting switch 50XB of the setting unit 50 (step S215). Then, it determines whether the switch position is changed or not (step S220), followed by proceeding to step S225 if the switch position is changed, or jumping to step S230 if not changed.

If the position of the downslope gradient angle setting switch 50XB is changed, the parameters for the integral constant Ki, i.e., the control constant, and the proportional valve offset value are set corresponding to the status of the downslope gradient angle setting switch 50XB and are outputted to the PID control means 130X and the addition means 140X (step S225).

Then, the controller reads the status of the target speed setting switch 50XA of the setting unit 50 (step S230). Then, it determines whether the switch position is changed or not (step S235), followed by proceeding to step S240 if the switch position is changed, or jumping to step S245 if not changed.

If the position of the target speed setting switch 50XA is changed, the target speed is set corresponding to the status of the target speed setting switch 50XA and is outputted to the subtraction means 120X (step S240).

Then, the controller reads, from the vehicle speed sensor 45, the actual vehicle speed value Vr of the dump truck at that time (step S245), and computes the difference $\Delta V$ between the target speed Vt set by the target speed setting switch 50XA and the vehicle speed value Vr in the subtraction means 120X (step S250).

Then, the PID control means 130X executes the PID control process, as shown in FIG. 5, on the difference $\Delta V$ between the target speed data Vt and the actual vehicle speed Vr, the difference $\Delta V$ being inputted from the subtraction means 120X, thereby computing the PID control value Fb (step S255). The addition means 140X adds the proportional valve offset output value outputted from the parameter selection means 110X to the PID control value Fb outputted from the PID control means 130X (step S260), and outputs the control value Fb to the solenoid proportional valve 60 (step S265).

According to this embodiment, as described above, the control can be avoided from coming into an unstable state with frequent changes of the parameters, such as the gradient angle and the target speed value, caused depending on conditions of the vehicle body. Also, since the target speed can be set in advance before the vehicle enters a downward slope, the control system can be avoided from coming into the control disable state. It is hence possible to improve controllability while the vehicle is running down the slope.

The configuration and operation of a downhill speed control system according to a third embodiment of the present invention will be described below with reference to FIGS. 1, 8 and 9. In this embodiment, the present invention is applied to a dump truck.

The system configuration of the dump truck employing the downhill speed control system according to this embodiment is the same as that shown in FIG. 1.

Figure 8:
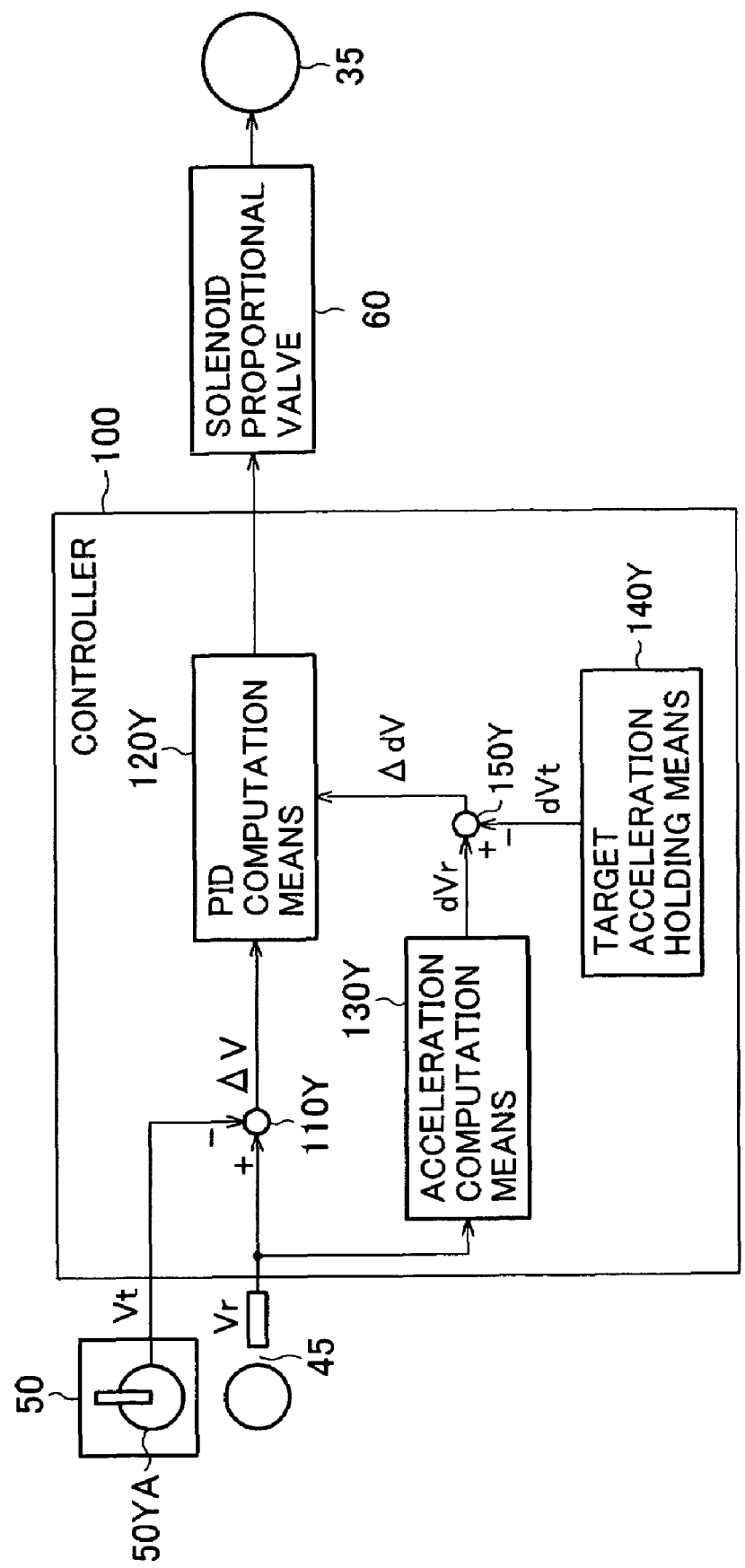
FIG. 8 is a system block diagram showing the configuration of a downhill speed control system according to a third embodiment of the present invention.
Figure 9:
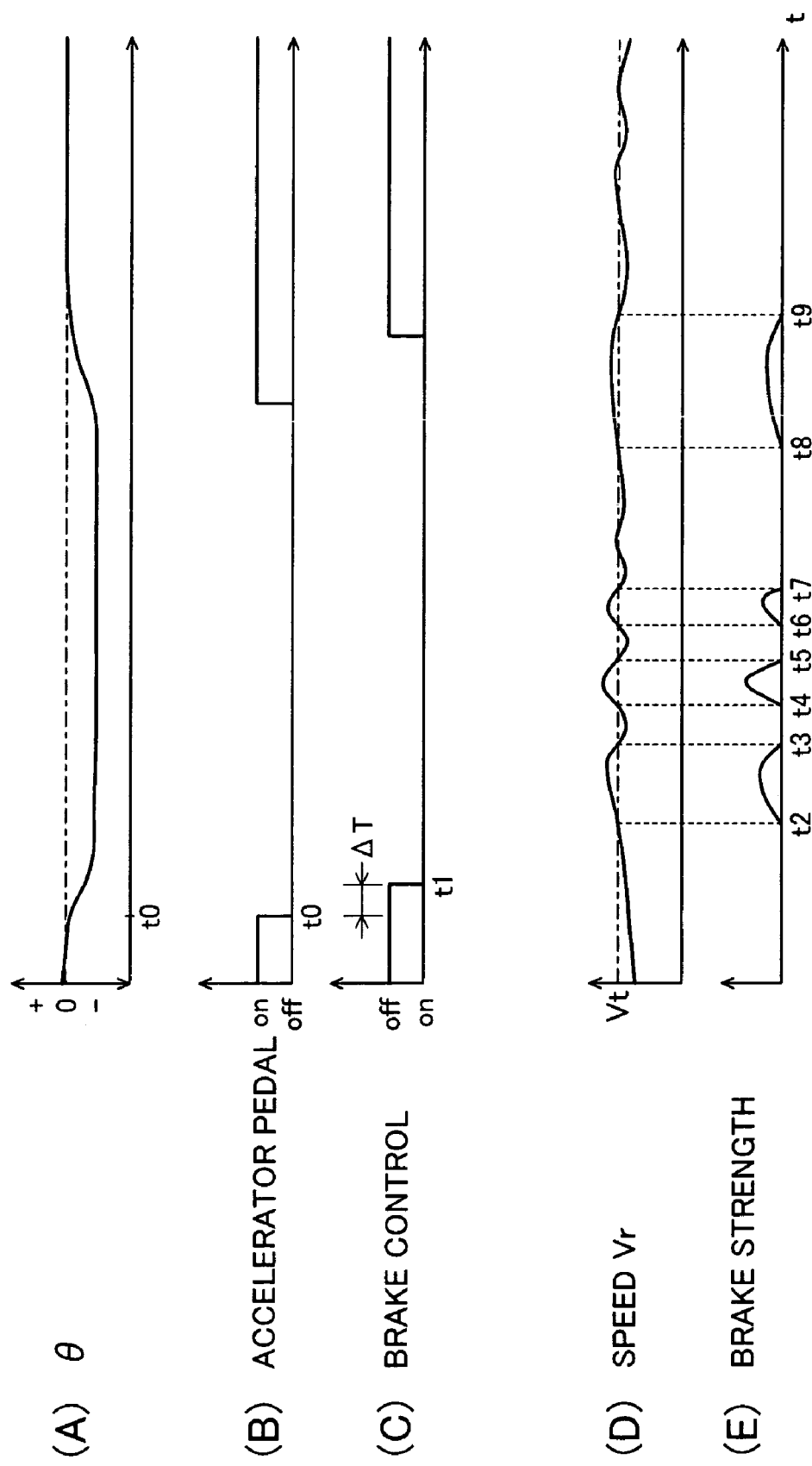
FIG. 9 is a timing chart showing control processes according to the third embodiment of the present invention.

FIG. 8 is a system block diagram showing the configuration of the downhill speed control system according to this embodiment.

A setting unit 50 has a target speed setting switch 50YA. The setting switch 50YA is in the form of a rotary switch or the like, which can set a setting value while changing it in a stepwise way. The target speed setting switch 50YA is a switch operated by the operator for changeably setting the speed running down a slope. The setting switch 50YA is able to select and set one of three target speeds, for example, 10 km/h, 12 km/h and 15 km/h.

A controller 100 comprises a subtraction means 110Y, a PID control means 120Y, an acceleration control means 130Y, a target acceleration holding means 140Y, and a subtraction means 150Y. The subtraction means 110Y computes a difference $\Delta V$ between target speed data Vt set by the target speed setting switch 50YA of the setting unit 50 and an actual vehicle speed Vr detected by the vehicle speed sensor 45, and then outputs it to the PID control means 120Y. In accordance with the output $\Delta V$ of the subtraction means 110Y, the PID control means 120Y outputs a control signal to the solenoid proportional valve 60 so that the actual vehicle speed Vr is matched with the target speed Vt.

Also, the acceleration control means 130Y computes an acceleration dVr from a differential value of the actual vehicle speed Vr detected by the vehicle speed sensor 45, and then outputs it to the subtraction means 150Y. On the other hand, the target acceleration holding means 140Y holds therein a target acceleration dVt (e.g., 1 km/s$^2$) in advance. The subtraction means 150Y computes a difference $\Delta dV$ between the acceleration dVr computed by the acceleration control means 130Y and the target acceleration dVt held by the target acceleration holding means 140Y, and then outputs it to the PID control means 120Y. In accordance with the output $\Delta dV$ of the subtraction means 150Y, the PID control means 120Y outputs a control signal to the solenoid proportional valve 60 to limit the acceleration dVr such that the acceleration dVr does not exceed above the target acceleration dVt. Processing procedures of the PID control means 120Y are the same as those shown in FIG. 5.

Although, in this embodiment, two systems of sensors and actuators comprising the vehicle speed sensors 45A, 45B and the solenoid proportional valves 60A, 60B are disposed respectively in association with the left and right wheels as shown in FIG. 1, the example shown in FIG. 8 illustrates shows only one of those two systems of sensors and actuators. In fact, the subtraction means 110Y, the PID control means 120Y, the acceleration control means 130Y, and the subtraction means 150Y are disposed corresponding to those two systems.

The progress of the control according to this embodiment will be described with reference to a timing chart shown in FIG. 9. The vertical axis of FIG. 9(A) represents the gradient angle θ of the road surface. More specifically, (+) represents an upward slope, and (−) represents a downward slope. The vertical axis of FIG. 9(B) represents a state (on) in which the accelerator pedal is stepped down, and a state (off) in which the accelerator pedal is not stepped down. FIG. 9(C) represents a state (on) in which the brake control is executed, and a state (off) in which the brake control is not executed. FIG. 9(D) represents the vehicle speed Vr detected by the vehicle speed sensor, and also represents the relationship relative to the target speed Vt. FIG. 9(E) represents the strength of brake produced from the retarder brakes 35A, 35B by the downhill speed control system according to this embodiment. The horizontal axis of each of FIGS. 9(A)–(E) represents time t.

As shown in FIG. 9(A), by way of example, when the gradient angle θ of the road surface becomes minus at time t0, this means the start of a downward slope. At the same time as t0 (or immediately before that time), the operator of the dump truck stops stepping-down of the accelerator pedal, whereupon the accelerator pedal comes into the off-state as shown in FIG. 9(B). Responsively, the controller 100 detects such a change in the stepping-down state of the accelerator pedal, and starts the downhill speed control from time t1 after the lapse of a time ΔT from t0, as shown in FIG. 9(C).

Assuming here that the speed Vr of the dump truck varies as indicated by a solid line in FIG. 9(D), when the actual speed Vr exceeds above the target speed Vt at time t2, the controller 100 increases the strength of the applied brake as shown in FIG. 9(E). Then, as shown in FIG. 9(D), when the actual speed Vr exceeds below the target speed Vt at time t3, the strength of the applied brake is reduced to 0. Similarly, the retarder brakes are actuated in periods between time t4 and t5, between time t6 and t7, and between time t8 and t9 in FIG. 9(D).

Further, in FIG. 9(D), a gradient (corresponding to the acceleration dVr) of the speed Vr at the time t2 is larger than a gradient (corresponding to the acceleration dVr) of the speed Vr at time t4, and the gradient (corresponding to the acceleration dVr) of the speed Vr at the time t4 is larger than the target acceleration dVt. Therefore, the control value Fb obtained with the proportional PID control in the PID control means 120 is increased and the strength of the applied brake is increased as shown in FIG. 9(E). With that control, the acceleration dVr is limited so as not to exceed above the target acceleration dVt and the actual speed Vr does not overshoot much above the target speed Vt.

Thus, according to this embodiment, by increasing the strength of the applied brake when the actual acceleration dVr becomes larger than the target acceleration dVt, the control is performed such that the acceleration dVr is limited so as not to exceed above the target acceleration dVt and the actual speed Vr does not overshoot much above the target speed Vt. As a result, even when the dump truck enters a steep downward slope, abrupt acceleration can be prevented from exceeding much beyond the target acceleration. It is hence possible to hold speed changes small even in the steep downward slope, and to improve stability in the control.

The configuration and operation of a downhill speed control system according to a fourth embodiment of the present invention will be described below with reference to FIGS. 10 to 13. In this embodiment, the present invention is applied to a dump truck.

Figure 10:
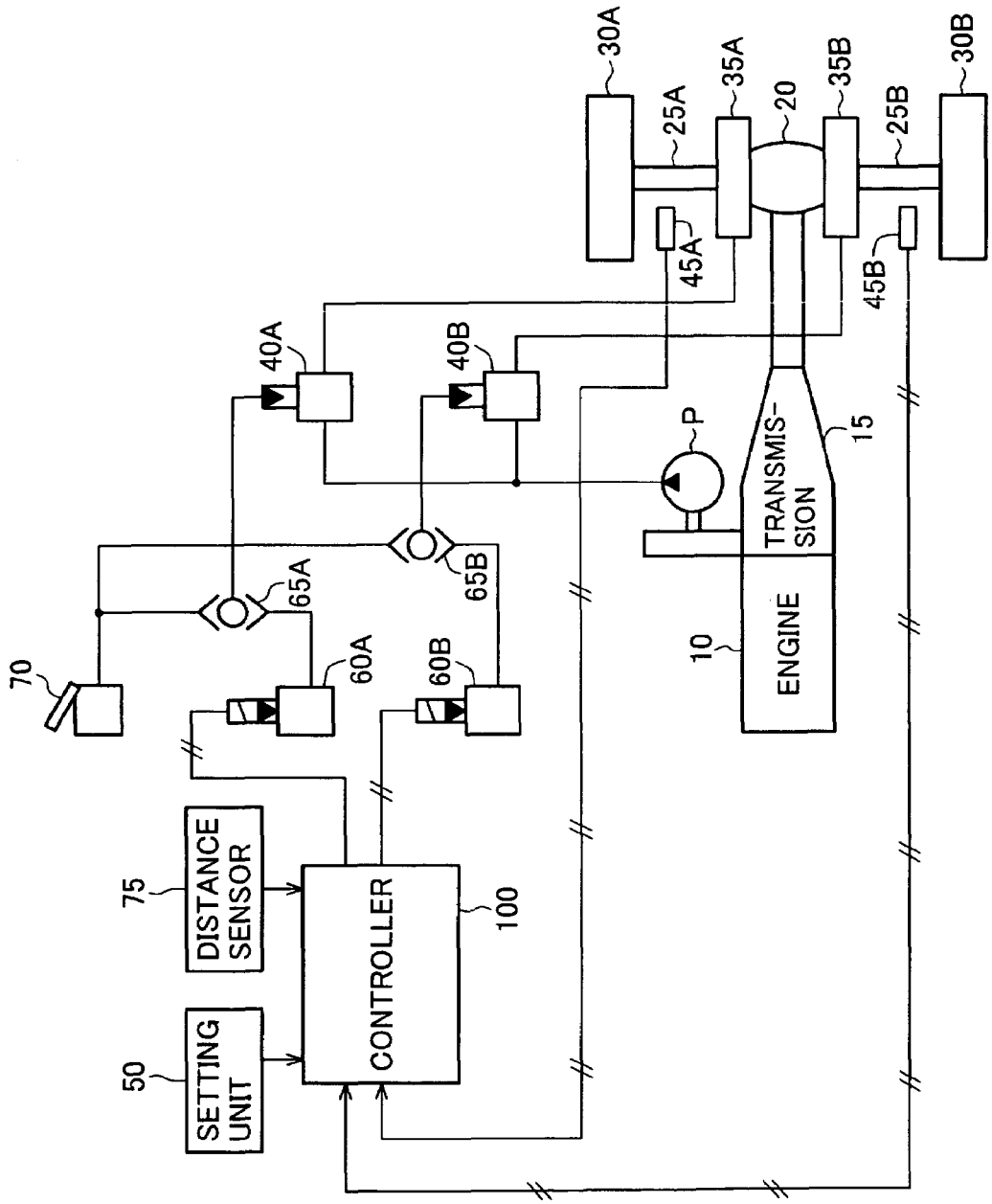
FIG. 10 is a block diagram showing the system configuration of a dump truck employing a downhill speed control system according to a fourth embodiment of the present invention.

FIG. 10 is a block diagram showing the system configuration of the dump truck employing the downhill speed control system according to the this embodiment.

A driving force produced by an engine 10 is transmitted to two drive wheels 30A, 30B through a transmission 15, a differential gear 20 and axles 25A, 25B, thereby running a body of the dump truck. Retarder brakes 35A, 35B for applying braking forces to the drive wheels 30A, 30B are attached respectively to the axles 25A, 25B. Respective hydraulic pressures are supplied to the retarder brakes 35A, 35B through brake valves 40A, 40B from a pump P driven by the engine 10.

Vehicle speed sensors 45A, 45B for detecting wheel rotation speeds are disposed respectively in association with the drive wheels 30A, 30B. Vehicle speed data detected by the vehicle speed sensors 45A, 45B is inputted to a controller 100. A setting unit 50 is used for setting a steering angle and a downslope gradient angle, and its details will be described below with reference to FIG. 11. The controller 100 receives, from a distance sensor 75, information regarding the distance (mileage) over which the vehicle has run. In particular, information regarding the distance from a start point of a downward slope is used in the controller 100. The controller 100 executes teaching of a target speed and reproduction control of the target speed. In the mode of teaching the target speed, based on the information regarding the distance from the start point of the downward slope inputted from the distance sensor 75 and the steering angle and the downslope gradient angle both set using the setting unit 50, the condition of the downward slope for each position of the downward slope (for each of various distances from the start point of the downward slope) is taught to the controller 100, which holds the taught data therein. In the mode of target speed reproduction control, the controller 100 reproduces the taught data held therein corresponding to the information regarding the distance from the start point of the downward slope inputted from the distance sensor 75, and then sets the target speed, etc. at that time. Further, the controller 100 outputs control signals to solenoid proportional valves 60A, 60B so that vehicle speeds detected by the vehicle speed sensors 45A, 45B are matched with the set target vehicle speed. The solenoid proportional valves 60A, 60B are connected respectively to the brake valves 40A, 40B through shuttle valves 65A, 65B to control the brake valves 40A, 40B, thereby controlling respective braking forces produced by the retarder brakes 35A, 35B. As a result, the vehicle speed is controlled to be matched with the target vehicle speed.

Further, a brake pedal 70 is connected to the shuttle valves 65A, 65B. Each of the shuttle valves 65A, 65B selects higher one of the pressure applied from the brake pedal 70 and the pressure applied from the corresponding solenoid proportional valve 60A, 60B, and transmits the selected pressure to the corresponding brake valve 40A, 40B. The retarder brakes 35A, 35B are usually automatically controlled by the controller 100. However, when an operator of the dump truck steps down the brake pedal 70, the retarder brakes 35A, 35B are operated to stop or decelerate a body of the dump truck in response to the intent of the operator.

Figure 11:
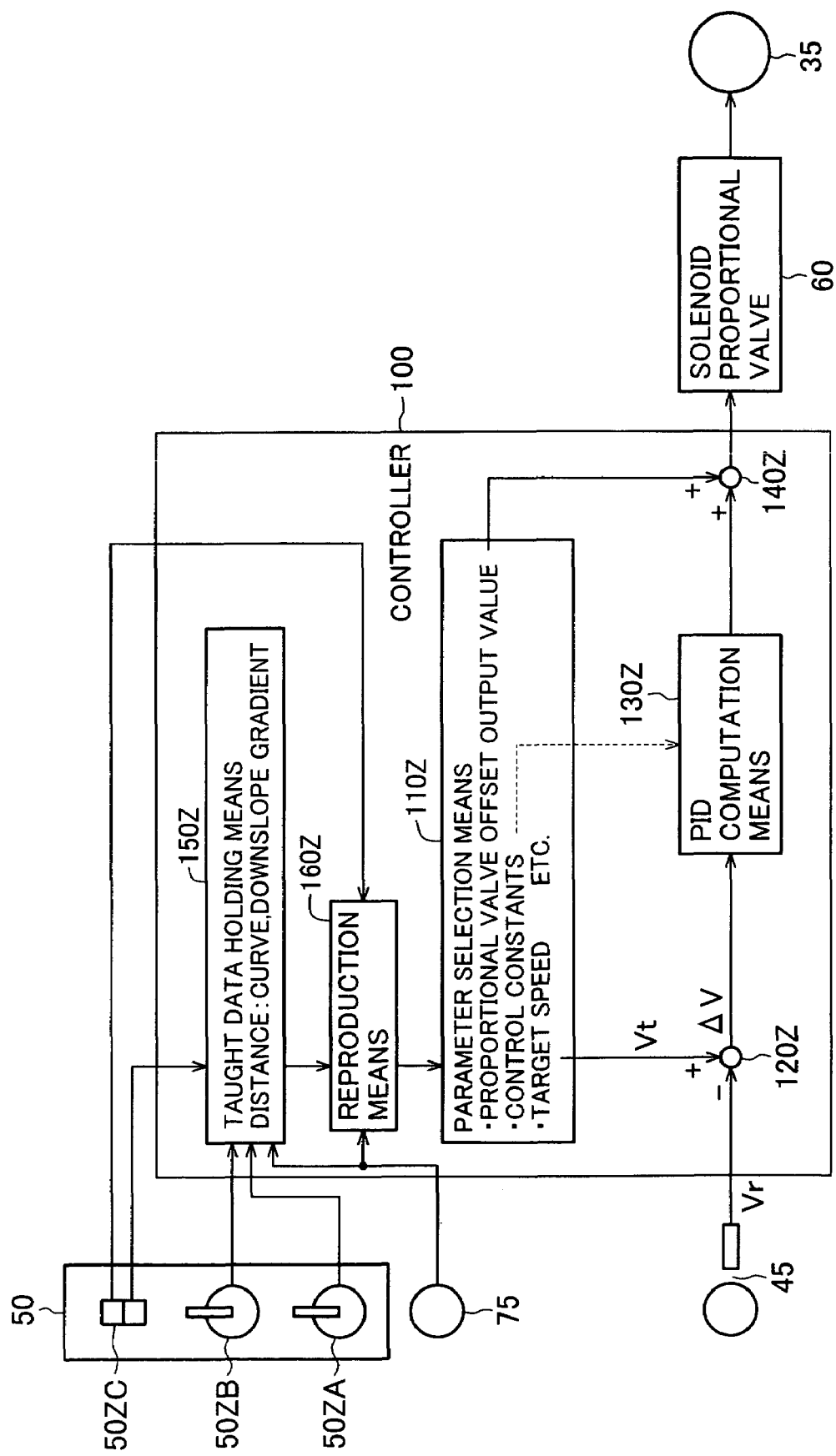
FIG. 11 is a system block diagram showing the configuration of the downhill speed control system according to the fourth embodiment of the present invention.

FIG. 11 is a system block diagram showing the configuration of the downhill speed control system according to this embodiment.

The setting unit 50 has a steering angle setting switch 50ZA, a downslope gradient angle setting switch 50ZB, and a teaching/reproduction selection switch 50ZC. The setting switches 50ZA, 50ZB are each in the form of a rotary switch or the like, which can set a setting value while changing it in a stepwise way. The steering angle setting switch 50ZA is a switch operated by the operator for changeably setting a steering angle of a downward slope and for teaching the steering angle that is taken by the vehicle running along a curve. The setting switch 50ZA is able to select and set one of six steering angles, for example, 0°, 20°, 40°, 60°, 80° and 100°. The downslope gradient angle setting switch 50ZB is a switch operated in the teaching mode by the operator for changeably setting a gradient angle of a downward slope before entering the downward slope. The setting switch 50ZB is able to select and set one of seven downslope gradient angles, for example, 0°, 5°, 10°, 15°, 20°, 25° and 30°. The teaching/reproduction selection switch 50ZC is a switch for selectively changing the control mode of the controller 100 between teaching control and reproduction control.

The controller 100 comprises a parameter selection means 110Z, a subtraction means 120Z, a PID control means 130Z, an addition means 140Z, a taught data holding means 150Z, and a reproduction means 160Z.

When the teaching/reproduction selection switch 50ZC is operated into a teaching state, the data set by the setting switches 50ZA, 50ZB is held in the taught data holding means 150Z in the controller 100 in sync with the information regarding the distance from the start point of the downward slope, which is inputted from the distance sensor 75. In the teaching operation, the operator of the dump truck operates the teaching/reproduction selection switch 50ZC into the teaching state, for example, at the start point of the downward slope, and then sets the steering angle by operating the steering angle setting switch 50ZA and the downslope gradient angle by operating the downslope gradient angle setting switch 50ZB. Generally, slopes over which the dump truck runs down are designed in advance to provide a certain steering angle and to have a certain gradient angle. Therefore, the teaching operation can be completed just by setting those parameters at the start point of the downward slope. When the steering angle and the gradient angle vary at a position midway the downward slope, the steering angle and the gradient angle are set respectively by the steering angle setting switch 50ZA and the downslope gradient angle setting switch 50ZB at that position, and then stored in the holding means 150Z in sync with the information regarding the distance from the start point of the downward slope, which is inputted from the distance sensor 75. Data of both the steering angle and the gradient angle of the downward slope can be obtained from map information for the relevant site.

When the teaching/reproduction selection switch 50ZC is operated into a reproduction state, the data set by the setting switches 50ZA, 50ZB is read by the reproduction means 160Z out of the taught data holding means 150Z in the controller 100 in sync with the information regarding the distance from the start point of the downward slope, which is inputted from the distance sensor 75.

Based on the steering angle and the downslope gradient angle both read out by the reproduction means 160Z in sync with the information regarding the distance from the start point of the downward slope, which is inputted from the distance sensor 75, the parameter selection means 110Z sets the target speed, the control constants, the proportional valve offset output value, etc. corresponding to the condition of the downward slope at that time. The parameter selection means 110Z includes a map for setting the target speed depending on the steering angle. The target speed is set in advance depending on the steering angle, for example, such that the target speed is 15 km/h when the steering angle is "0°", the target speed is 12 km/h when the steering angle is "20°", the target speed is 10 km/h when the steering angle is "40°", the target speed is 8 km/h when the steering angle is "60°", and the target speed is 6 km/h when the steering angle is "80°".

The subtraction means 120Z computes a difference $\Delta V$ between target speed data Vt outputted from the parameter selection means 110Z and an actual vehicle speed Vr detected by the vehicle speed sensor 45, and then outputs it to the PID control means 130Z. In accordance with the output $\Delta V$ of the subtraction means 120Z, the PID control means 130Z outputs a control signal to the solenoid proportional valve 60 through the addition means 140Z so that the actual vehicle speed Vr is matched with the target speed Vt. Although, in this embodiment, two systems of sensors and actuators comprising the vehicle speed sensors 45A, 45B and the solenoid proportional valves 60A, 60B are disposed respectively in association with the left and right wheels as shown in FIG. 10, the example shown in FIG. 11 illustrates only one of those two systems of sensors and actuators. In fact, the parameter selection means 110Z and the PID control means 130Z are disposed corresponding to those two systems.

Further, the parameter selection means 110Z includes a map for setting the control constants for the PID control corresponding to the steering angle and the downslope gradient angle, which are reproduced from the reproduction means 160Z, and then outputs the control constants for the PID control to the PID control means 130Z.

The PID control means 130Z executes arithmetic processing shown in FIG. 5. More specifically, in proportional control, a proportional control value Fb-p is computed by multiplying a proportional control constant Kp by the difference $\Delta V$ between the target speed data Vt and the actual vehicle speed Vr, the difference $\Delta V$ being inputted from the subtraction means 120Z (step S132). In integral control, an integral control value Fb-i is computed by multiplying an integral constant Ki by an integral value of the difference $\Delta V$ between the target speed data Vt and the actual vehicle speed Vr, the difference $\Delta V$ being inputted from the subtraction means 120Z (step S134). In differential control, a differential control value Fb-d is computed by multiplying a differential constant Kd by a differential value of the difference $\Delta V$ between the target speed data Vt and the actual vehicle speed Vr, the difference $\Delta V$ being inputted from the subtraction means 120Z (step S136). Then, the computed control values (i.e., the proportional control value Fb-p, the integral control value Fb-i, and the differential control value Fb-d) are added to obtain a PID control value Fb. In FIG. 10, one of the control constants outputted from the parameter selection means 110Z is the integral constant Ki. The integral constant Ki is modified depending on the downslope gradient angle. The parameter selection means 110Z includes a map for setting the integral constant corresponding to the downslope gradient angle. The integral constant Ki is set in advance such that, as the downslope gradient angle increases, the integral constant is increased to increase the strength of the applied brake. The parameter selection means 110Z reads the integral constant Ki for the PID control out of the integral constant map, which corresponds to the downslope gradient angle reproduced from the reproduction means 160Z, and then outputs the read integral constant Ki to the PID control means 130Z.

Further, the parameter selection means 110Z outputs, to the addition means 140Z, a proportional valve offset value corresponding to the downslope gradient angle that is reproduced from the reproduction means 160Z. The proportional valve offset value corresponds to the strength of the applied brake and serves as a factor for improving convergence when feedback control is performed so that the actual speed is matched with the predetermined target set speed. The proportional valve offset value is set in advance such that, as with the integral constant map, as the downslope gradient angle increases, the proportional valve offset value is increased to increase the strength of the applied brake. The parameter selection means 110Z reads the proportional valve offset value, which corresponds to the downslope gradient angle reproduced from the reproduction means 160Z, and then outputs the read proportional valve offset value to the addition means 140Z. The addition means 140Z adds the output of the PID control means 130Z and the proportional valve offset value outputted from the parameter selection means 110Z. The addition result is outputted to the solenoid proportional valve 60 to control the braking force produced by the retarder brake 35.

Thus, the operator teaches the steering angle and the gradient angle in advance by operating the steering angle setting switch 50ZA and the downslope gradient angle setting switch 50ZB of the setting unit 50, respectively, and the taught data is held in the holding means 150Z in sync with the information regarding the distance from the start point of the downward slope, which is inputted from the distance sensor 75. In the reproduction mode, based on the steering angle and the downslope gradient angle both read out by the reproduction means 160Z in sync with the information regarding the distance from the start point of the downward slope, which is inputted from the distance sensor 75, the target speed, the control constants, the proportional valve offset output value, etc. are set corresponding to the condition of the downward slope at that time and the retarder brakes 35 are controlled so that the target speed corresponding to the previously taught condition of the downward slope is obtained. Hence, the target speed can be easily set only with the teaching operation made by the operator of the dump truck. According to the control system disclosed in JP-A-6-135260, the target vehicle speed setting circuit sets the target speed depending on an output of the road surface gradient sensor, and the target speed is decreased when the gradient angle of a downward slope changes only after a vehicle has entered the downward slope. Therefore, if the actual vehicle speed at the time when the vehicle has entered the downward slope differs much from that set by the target vehicle speed setting circuit, the control system may be brought into a control disabled state. In contrast, in this embodiment, the control system can be avoided from coming into a control disable state because the target speed can be set before entering the downward slope with the operation made by the operator.

Further, since the operator teaches the gradient angle in advance by operating the downslope gradient angle setting switch 50ZB of the setting unit 50 and the taught data is held in the holding means 150Z in sync with the information regarding the distance from the start point of the downward slope, which is inputted from the distance sensor 75, the downslope gradient angle can be easily set. In the reproduction mode, based on the downslope gradient angle read out by the reproduction means 160Z in sync with the information regarding the distance from the start point of the downward slope, which is inputted from the distance sensor 75, the target speed, the control constants, the proportional valve offset output value, etc. are set corresponding to the condition of the downward slope at that time and the retarder brakes 35 are controlled so that the target speed corresponding to the previously taught condition of the downward slope is obtained. Since the gradient angle is set by operating the downslope gradient angle setting switch, the gradient angle is regarded as being the same and the target speed is held at the set value so long as the setting is not changed. Hence, the control is avoided from coming into an unstable state due to irregularities of the road surface. Generally, in places such as mining sites where large-sized dump trucks are employed, slopes are designed to have a certain downslope gradient angle, and the operator of the dump truck is notified of information regarding the designed gradient angle in advance. Accordingly, it is possible to easily set and change the gradient angle.

Additionally, the control system can be constructed at a lower cost because of no need of the inclinometer and the load sensor.

Processing of the teaching operation executed in the controller 100 will be described below with reference to FIG. 12. The processing of the teaching operation is executed when the teaching/reproduction selection switch 50ZC is operated into the teaching operation side.

Figure 12:
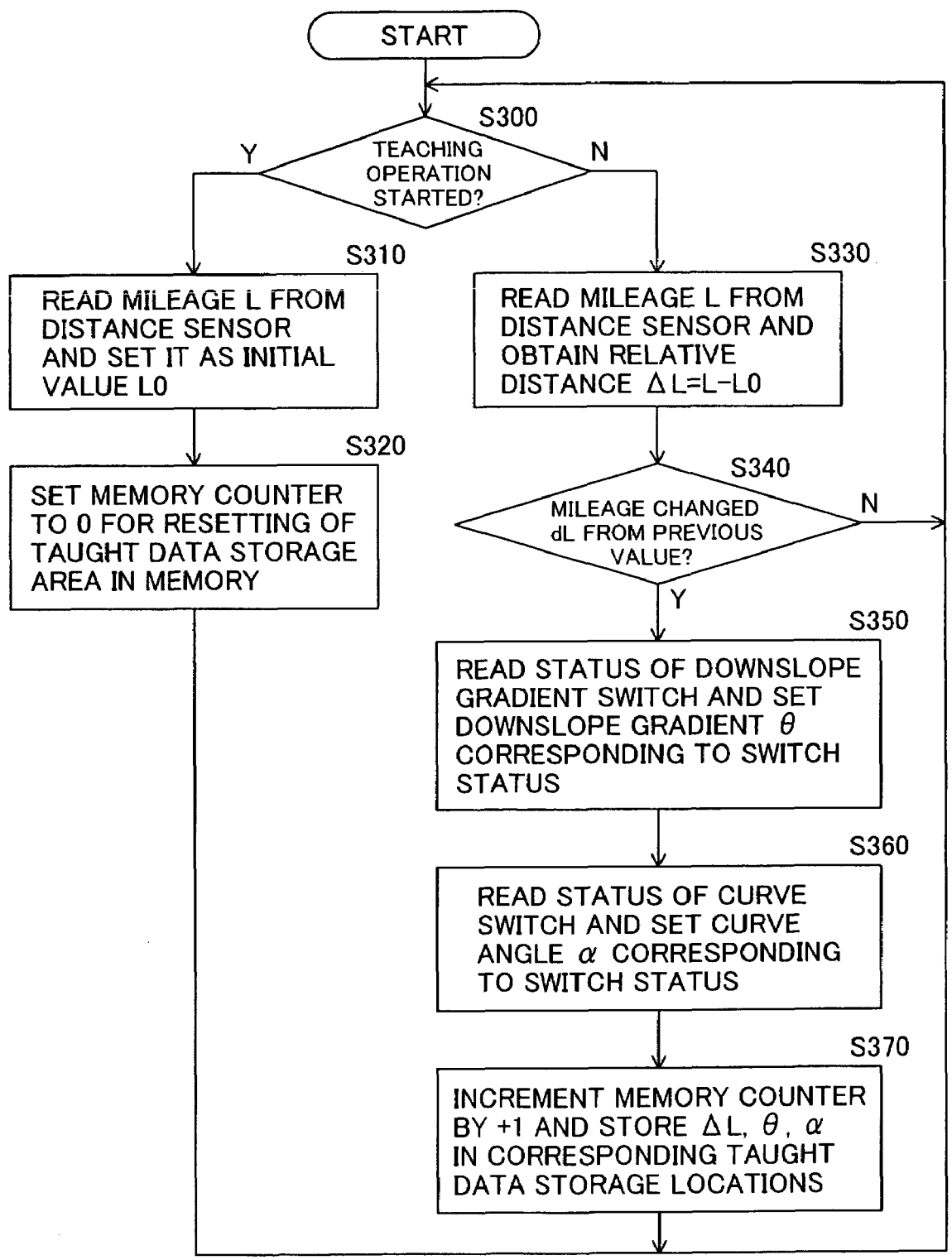
FIG. 12 is a flowchart showing details of processing executed in a teaching operation mode according to the fourth embodiment of the present invention.

Referring to FIG. 12, the controller first determines whether the teaching operation is to be started or not (step S300), followed by proceeding to step S310 if the teaching operation is to be started, or to step S330 in subsequent cycles.

If the teaching operation is to be started, the controller reads a mileage L from the distance sensor 75 and sets it as an initial value L0 in the taught data holding means 150Z (step S310). Then, the controller sets a memory counter in the taught data holding means 150Z to "0" for resetting of a taught data storage area in a memory (step S320). The distance sensor 75 is constituted as an odometer or the like. At the start of the teaching operation, not only the distance data for the teaching operation, but also the data of the steering angle and the downslope gradient angle both stored in the taught data storage area are all initialized.

After the initialization, the controller reads the mileage L from the distance sensor 75 and obtains a relative distance $\Delta L = L - L0$ (step S330). It then determines whether the mileage has changed dL from the previous value (step S340), followed by proceeding to step S350 if changed, or returning to step S300 if not changed.

If the mileage has changed, the controller reads the status of the downslope gradient angle switch 50ZA and sets a downslope gradient angle $\theta$ corresponding to the switch position (step S350). Then, the controller reads the status of the steering angle switch (curve switch) 50ZB and sets a steering angle (curve angle) $\alpha$ corresponding to the switch position (step S360). Then, the controller increments the memory counter by +1 and stores the relative distance $\Delta L$, the downslope gradient angle $\theta$, and the steering angle (curve angle) $\alpha$ in the corresponding taught data storage area of the memory in the taught data holding means 150Z (step S370).

Processing of the reproduction operation executed in the controller 100 will be described below with reference to FIG. 13. The processing of the reproduction operation is executed when the teaching/reproduction selection switch 50ZC is operated into the reproduction operation side.

Figure 13:
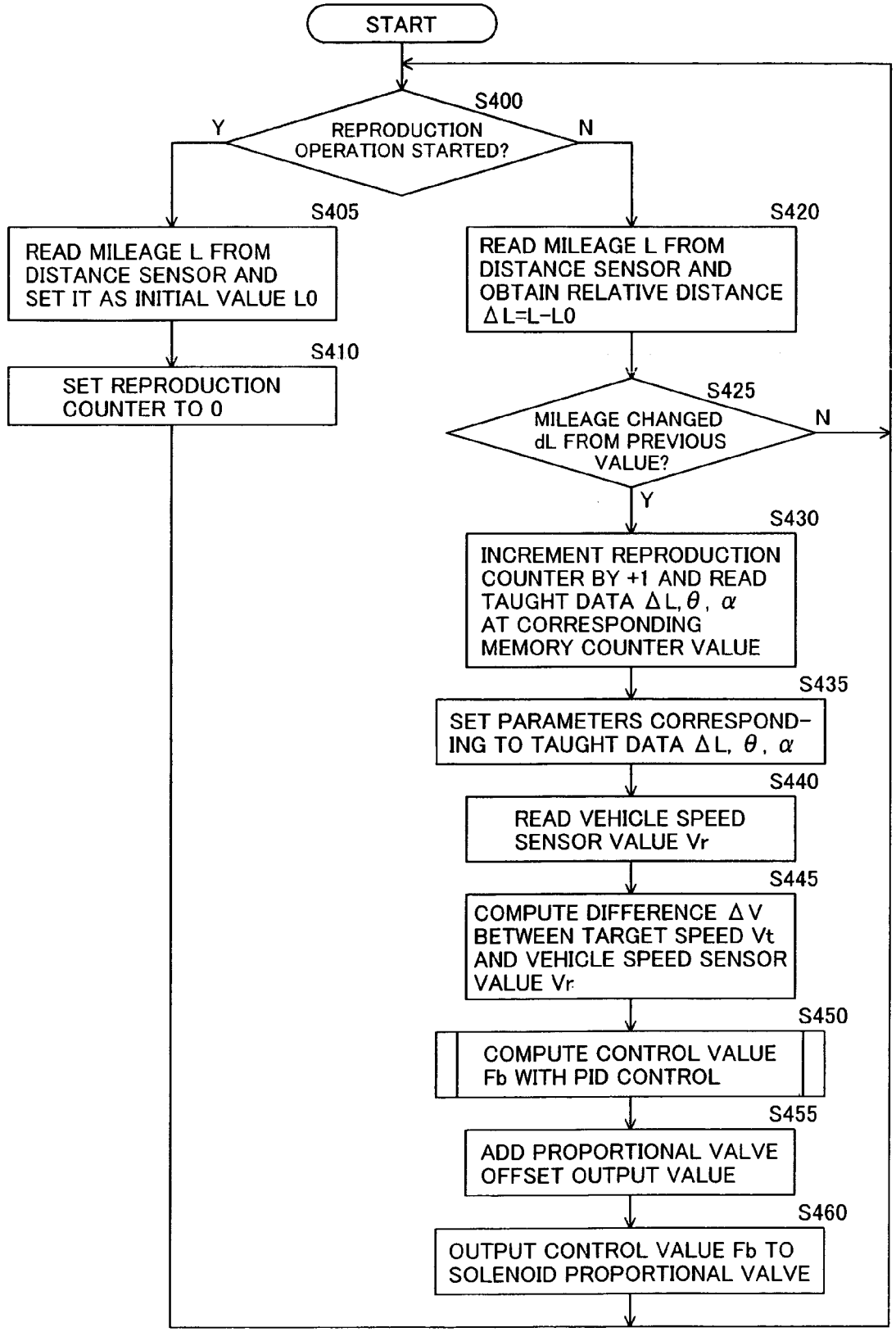
FIG. 13 is a flowchart showing details of processing executed in a reproducing operation mode according to the fourth embodiment of the present invention.

Referring to FIG. 13, the controller first determines whether the reproduction operation is to be started or not (step S400), followed by proceeding to step S405 if the reproduction operation is to be started, or to step S420 in subsequent cycles.

If the reproduction operation is to be started, the controller reads a mileage L from the distance sensor 75 and sets it as an initial value L0 in the taught data holding means 150Z (step S405). Then, the controller sets a reproduction counter in the taught data holding means 150Z to "0" (step S410).

After the initialization, the controller reads the mileage L from the distance sensor 75 and obtains a relative distance $\Delta L = L - L0$ (step S420). It then determines whether the mileage has changed dL from the previous value (step S425), followed by proceeding to step S430 if changed, or returning to step S400 if not changed.

Then, the reproduction means 160Z increments the reproduction counter by +1, reads the taught data (i.e., the relative distance ΔL, the downslope gradient angle θ, and the steering angle α) out of the corresponding taught data storage area of the memory in the taught data holding means 150Z, and outputs the read data to the parameter selection means 110Z (step S430).

Then, the parameter selection means 110Z sets the parameters (i.e., the target speed Vt, the integral constant Ki, and the proportional valve offset value) corresponding to the taught data (i.e., the relative distance ΔL, the downslope gradient angle θ, and the steering angle α) read out by the reproduction means 160Z (step S435). The subtraction means 120Z reads the actual vehicle speed value Vr from the vehicle speed sensor 45 (step S440), computes a difference ΔV between the target speed Vt outputted from the parameter selection means 110Z and the actual vehicle speed value Vr, and then outputs it to the PID control means 130Z (step S445).

Then, the PID control means 130Z computes a PID control value Fb through the control process, described above in connection with FIG. 5, based on the speed difference value ΔV outputted from the subtraction means 120Z and the integral constant Ki outputted from the parameter selection means 110Z, the PID control value Fb being outputted to the addition means 140Z (step S450). The addition means 140Z adds the control value Fb outputted from the PID control means 130Z to the proportional valve offset value outputted from the parameter selection means 110Z (step S455), and outputs the control value Fb to the solenoid proportional valve 60 (step S460), thereby controlling the strength of brake applied from the retarder brake 35.

According to this embodiment, as described above, since the parameters are set by teaching the target speed, etc. in advance, the control can be avoided from coming into an unstable state with frequent changes of the parameters, such as the gradient angle and the target speed value, caused depending on conditions of the vehicle body. Also, since the target speed can be set in advance before the vehicle enters a downward slope, the control system can be avoided from coming into the control disable state. It is hence possible to improve controllability while the vehicle is running down the slope.

The configuration and operation of a downhill speed control system according to a fifth embodiment of the present invention will be described below with reference to FIGS. 14 to 16. In this embodiment, the present invention is applied to a dump truck.

Figure 14:
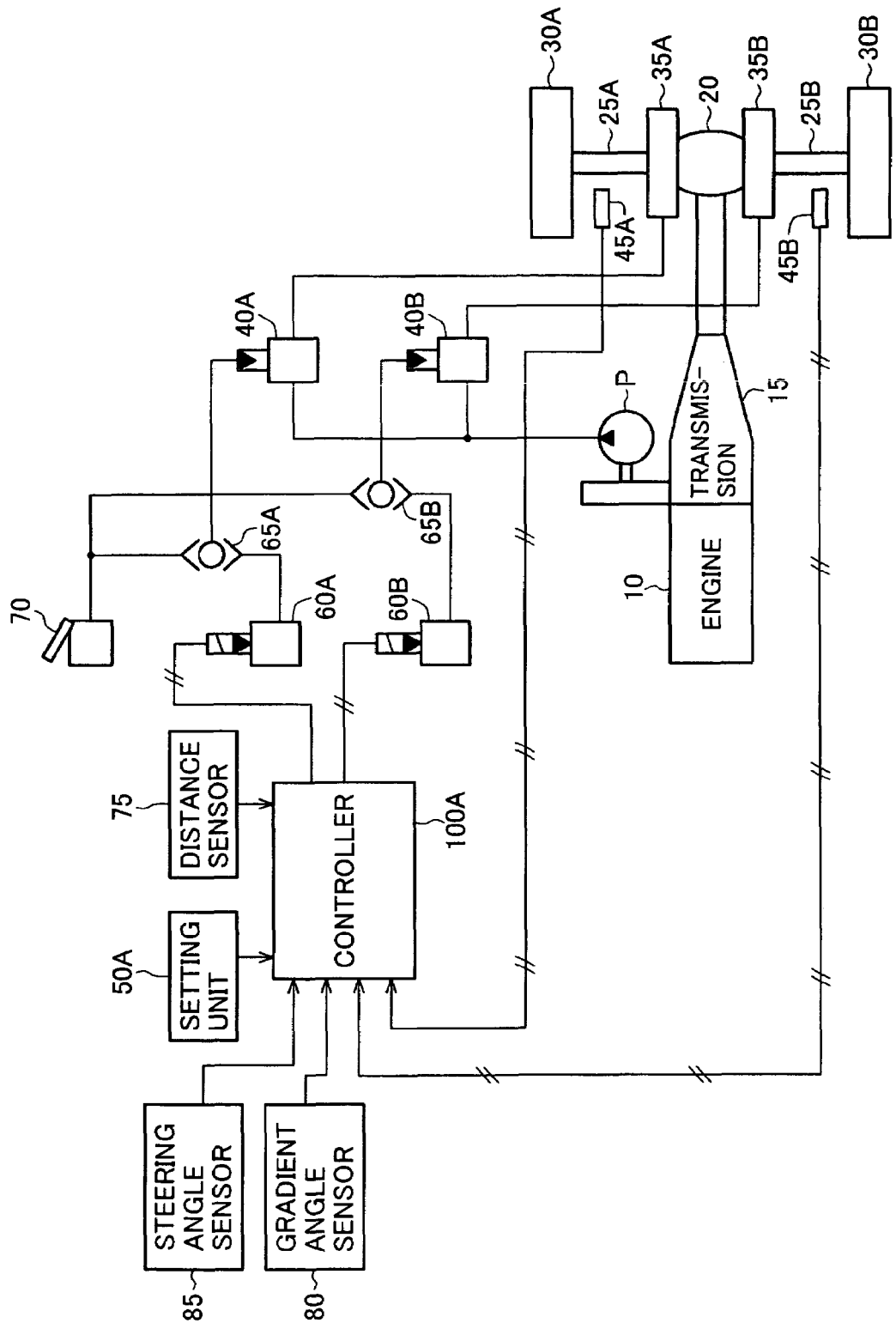
FIG. 14 is a block diagram showing the system configuration of a dump truck employing a downhill speed control system according to a fifth embodiment of the present invention.

FIG. 14 is a block diagram showing the system configuration of a dump truck employing the downhill speed control system according to this embodiment. The same symbols as those in FIG. 10 denote the same components. This fifth embodiment differs from the embodiment shown in FIG. 10 in that the former includes a downslope inclinometer 80 for detecting a gradient angle of a downward slope and a steering angle sensor 85 for detecting a steering angle. A setting unit 50A includes, as described below, only a teaching/reproduction selection switch 50ZC.

Figure 15:
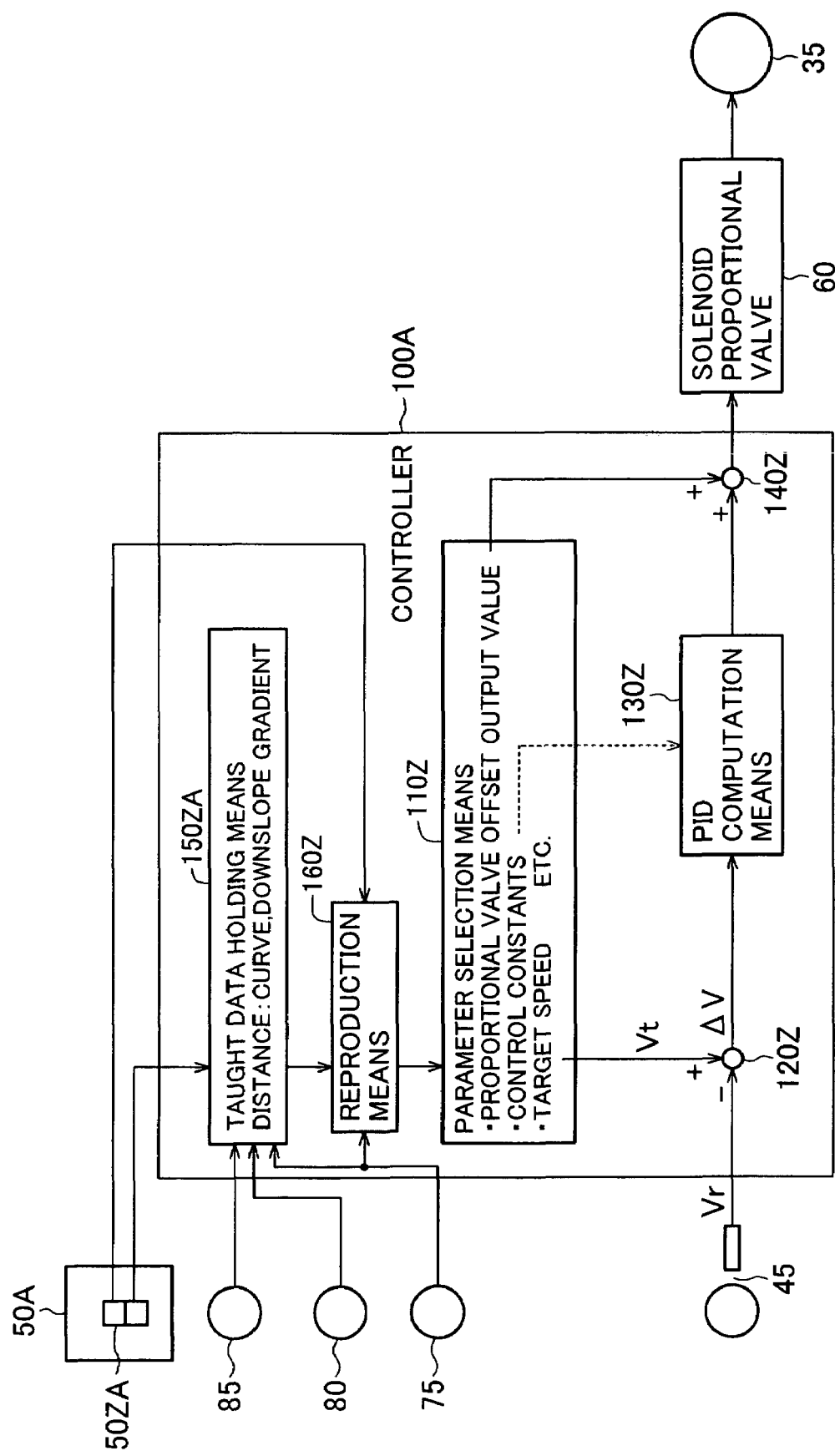
FIG. 15 is a system block diagram showing the configuration of the downhill speed control system according to the fifth embodiment of the present invention.

FIG. 15 is a system block diagram showing the configuration of the downhill speed control system according to this embodiment.

The setting unit 50A includes the teaching/reproduction selection switch 50ZC as in the embodiment shown in FIG. 11. The teaching/reproduction selection switch 50ZC is a switch for selectively changing the control mode of a controller 100A between teaching control and reproduction control.

The controller 100A comprises a parameter selection means 110Z, a subtraction means 120Z, a PID control means 130Z, an addition means 140Z, a taught data holding means 150ZA, and a reproduction means 160Z.

This fifth embodiment differs from the embodiment shown in FIG. 11 in the teaching operation executed by the taught data holding means 150ZA. This differing point will be described below. When the teaching/-reproduction selection switch 50ZC is operated into the teaching state, data of the downslope gradient angle detected by the downslope inclinometer 80 and data of the steering angle detected by the steering angle sensor 85 are held in the taught data holding means 150ZA in the controller 100A in sync with information regarding the distance from a start point of a downward slope, which is inputted from a distance sensor 75. In the teaching operation, the operator of the dump truck operates the teaching/reproduction selection switch 50ZC into the teaching state, for example, at the start point of the downward slope. Then, as the vehicle starts to run down the slope, the downslope gradient angle data detected by the downslope inclinometer 80 and the steering angle data detected by the steering angle sensor 85 are held in the holding means 150ZA in sync with the information regarding the distance from the start point of the downward slope, which is inputted from the distance sensor 75.

When the teaching/reproduction selection switch 50ZC is operated into a reproduction state, the downslope gradient angle data detected by the downslope inclinometer 80 and the steering angle data detected by the steering angle sensor 85 are read by the reproduction means 160Z out of the taught data holding means 150ZA in the controller 100 in sync with the information regarding the distance from the start point of the downward slope, which is inputted from the distance sensor 75.

Based on the steering angle and the downslope gradient angle both read out by the reproduction means 160Z in sync with the information regarding the distance from the start point of the downward slope, which is inputted from the distance sensor 75, the parameter selection means 110Z sets the target speed, the control constants, the proportional valve offset output value, etc. corresponding to the condition of the downward slope at that time. The parameter selection means 110Z includes a map for setting the target speed depending on the steering angle. The target speed is set in advance depending on the steering angle, for example, such that the target speed is 15 km/h when the steering angle is "0°", the target speed is 12 km/h when the steering angle is "1 to 20°", the target speed is 10 km/h when the steering angle is "21 to 40°", the target speed is 8 km/h when the steering angle is "41 to 60°", and the target speed is 6 km/h when the steering angle is "61 to 80°".

The subtraction means 120Z computes a difference ΔV between target speed data Vt outputted from the parameter selection means 110Z and an actual vehicle speed Vr detected by the vehicle speed sensor 45, and then outputs it to the PID control means 130Z. In accordance with the output ΔV of the subtraction means 120Z, the PID control means 130Z outputs a control signal to the solenoid proportional valve 60 through the addition means 140Z so that the actual vehicle speed Vr is matched with the target speed Vt. Also, the parameter selection means 110Z includes a map for setting the control constants for the PID control, which correspond to the downslope gradient angle reproduced form the reproduction means 160Z, and it outputs the control constants for the PID control to the PID control means 130Z.

The PID control means 130Z executes arithmetic processing similar to that described above in connection with FIG.

5. In short, the PID control means 130Z computes a PID control value Fb from the difference ΔV between the target speed data Vt and the actual vehicle speed Vr, the difference ΔV being inputted from the subtraction means 120Z. An integral constant Ki as one of the integral constants outputted from the parameter selection means 110Z is set in advance such that, as the downslope gradient angle increases, the integral constant Ki is increased to increase the strength of the applied brake. The parameter selection means 110Z reads the integral constant Ki for the PID control out of an integral constant map, which corresponds to the downslope gradient angle reproduced from the reproduction means 160Z, and then outputs the read integral constant Ki to the PID control means 130Z.

Further, the parameter selection means 110Z outputs, to the addition means 140Z, a proportional valve offset value corresponding to the downslope gradient angle that is reproduced from the reproduction means 160Z. The proportional valve offset value is set in advance such that, as with the integral constant map, as the downslope gradient angle increases, the proportional valve offset value is increased to increase the strength of the applied brake. The parameter selection means 110Z reads the proportional valve offset value, which corresponds to the downslope gradient angle reproduced from the reproduction means 160Z, and then outputs the read proportional valve offset value to the addition means 140Z. The addition means 140Z adds the output of the PID control means 130Z and the proportional valve offset value outputted from the parameter selection means 110Z. The addition result is outputted to the solenoid proportional valve 60 to control the braking force produced by the retarder brake 35.

Thus, the downslope gradient angle data detected by the downslope inclinometer 80 and the steering angle data detected by the steering angle sensor 85 are held in advance in the holding means 150ZA in sync with the information regarding the distance from the start point of the downward slope, which is inputted from the distance sensor 75. In the reproduction mode, based on the steering angle and the downslope gradient angle both read out by the reproduction means 160Z in sync with the information regarding the distance from the start point of the downward slope, which is inputted from the distance sensor 75, the target speed, the control constants, the proportional valve offset output value, etc. are set corresponding to the condition of the downward slope at that time and the retarder brakes 35 are controlled so that the target speed corresponding to the previously taught condition of the downward slope is obtained. Hence, the target speed can be easily set only with the teaching operation made by the operator of the dump truck. Further, in this embodiment, since the target speed can be set before entering the downward slope with the operation made by the operator, the control system can be avoided from coming into a control disable state.

In addition, the operator of the dump truck can easily teach the condition of the downward slope just by setting the teaching/reproduction selection switch to the teaching side.

Processing of the teaching operation executed in the controller 100 will be described below with reference to FIG. 16. The processing of the teaching operation is executed when the teaching/reproduction selection switch 50ZC is operated into the teaching operation side.

Figure 16:
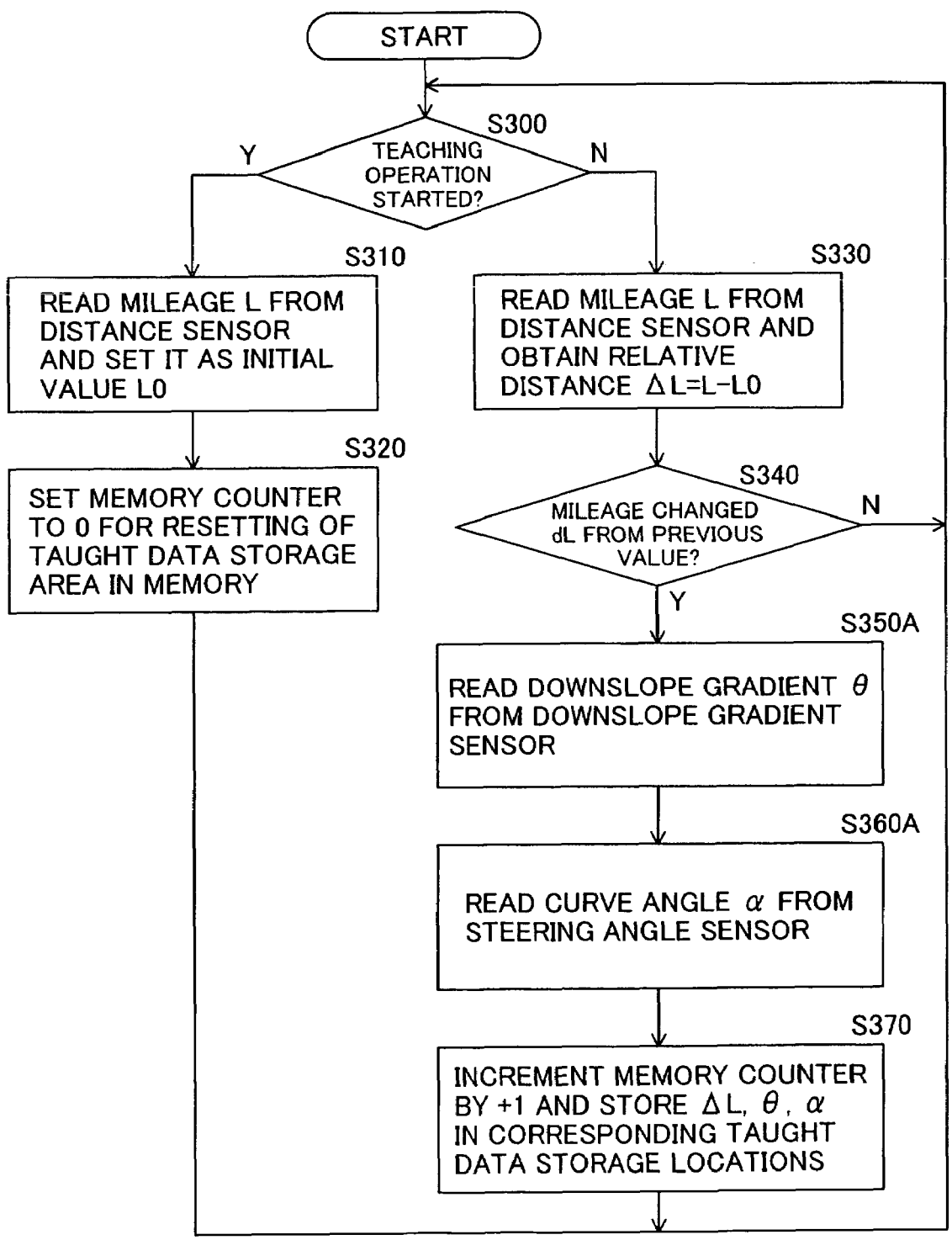
FIG. 16 is a flowchart showing details of processing executed in a teaching operation mode according to the fifth embodiment of the present invention.

Processing procedures shown in FIG. 16 are basically the same as those of the teaching operation shown in FIG. 12 except for processing of steps S350A and S360A. More specifically, if it is determined in step S340 that the mileage has changed, the controller reads a downslope gradient angle θ from the downslope inclinometer 80 (step S350A), and reads a steering angle α from the steering angle sensor 85 (step S360A). Then, the controller increments the memory counter by +1 and stores the relative distance ΔL, the downslope gradient angle θ, and the steering angle α in the corresponding taught data storage area of the memory in the taught data holding means 150Z (step S370).

Processing procedures of the reproduction operation executed in the controller 100 are the same as those shown in FIG. 12.

According to this embodiment, as described above, since the parameters are set by teaching the target speed, etc. in advance and the set parameters are read in sync with the relative distance data in the reproduction mode to control the strength of applied brake, the control can be avoided from coming into an unstable state with frequent changes of the parameters, such as the gradient angle and the target speed value, caused depending on conditions of the vehicle body. Also, since the target speed can be set in advance before the vehicle enters a downward slope, the control system can be avoided from coming into the control disable state. It is hence possible to improve controllability while the vehicle is running down the slope.

The configuration and operation of a downhill speed control system according to a sixth embodiment of the present invention will be described below with reference to FIGS. 17 to 20. In this embodiment, the present invention is applied to a dump truck.

Figure 17:
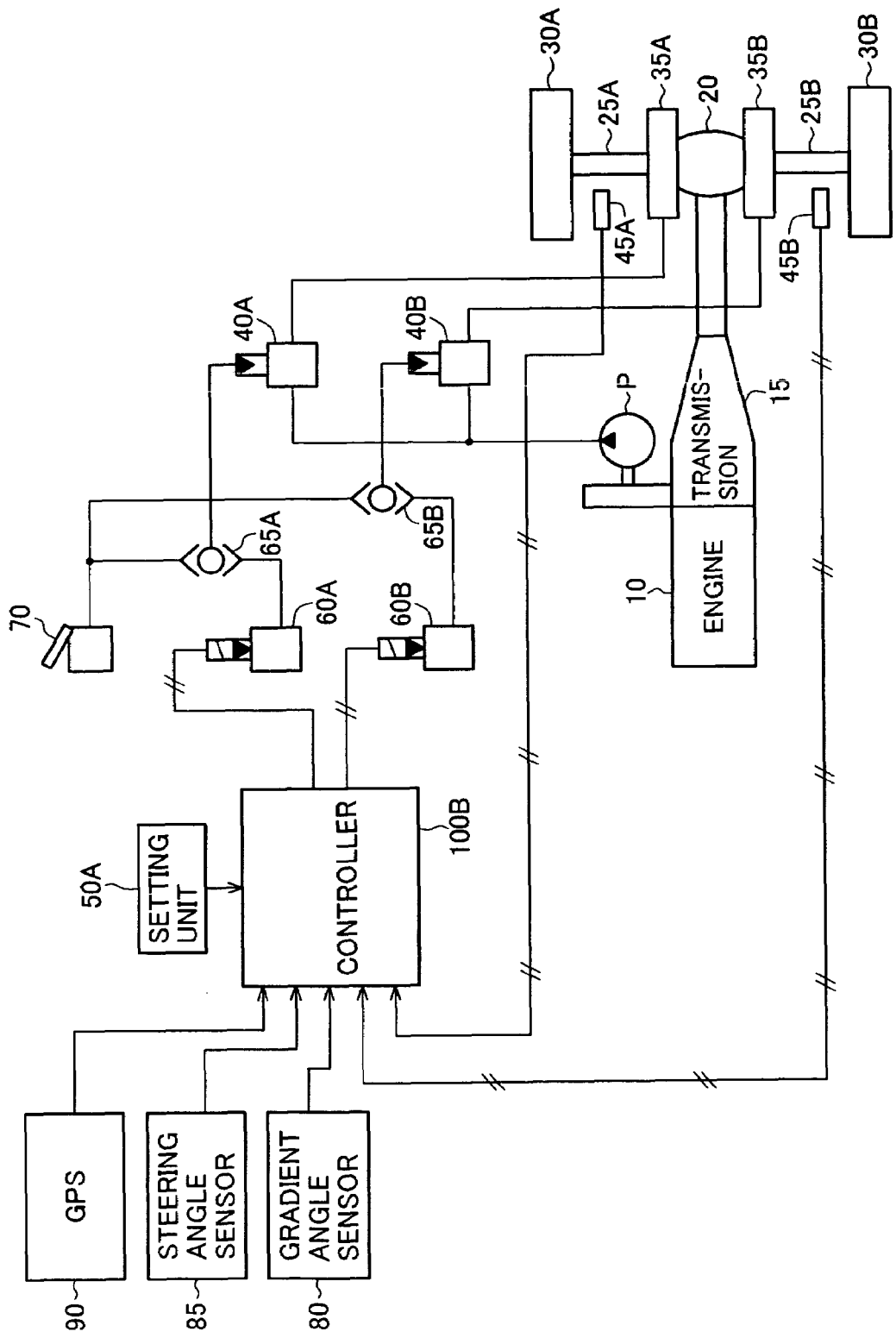
FIG. 17 is a block diagram showing the system configuration of a dump truck employing a downhill speed control system according to a sixth embodiment of the present invention.
Figure 18:
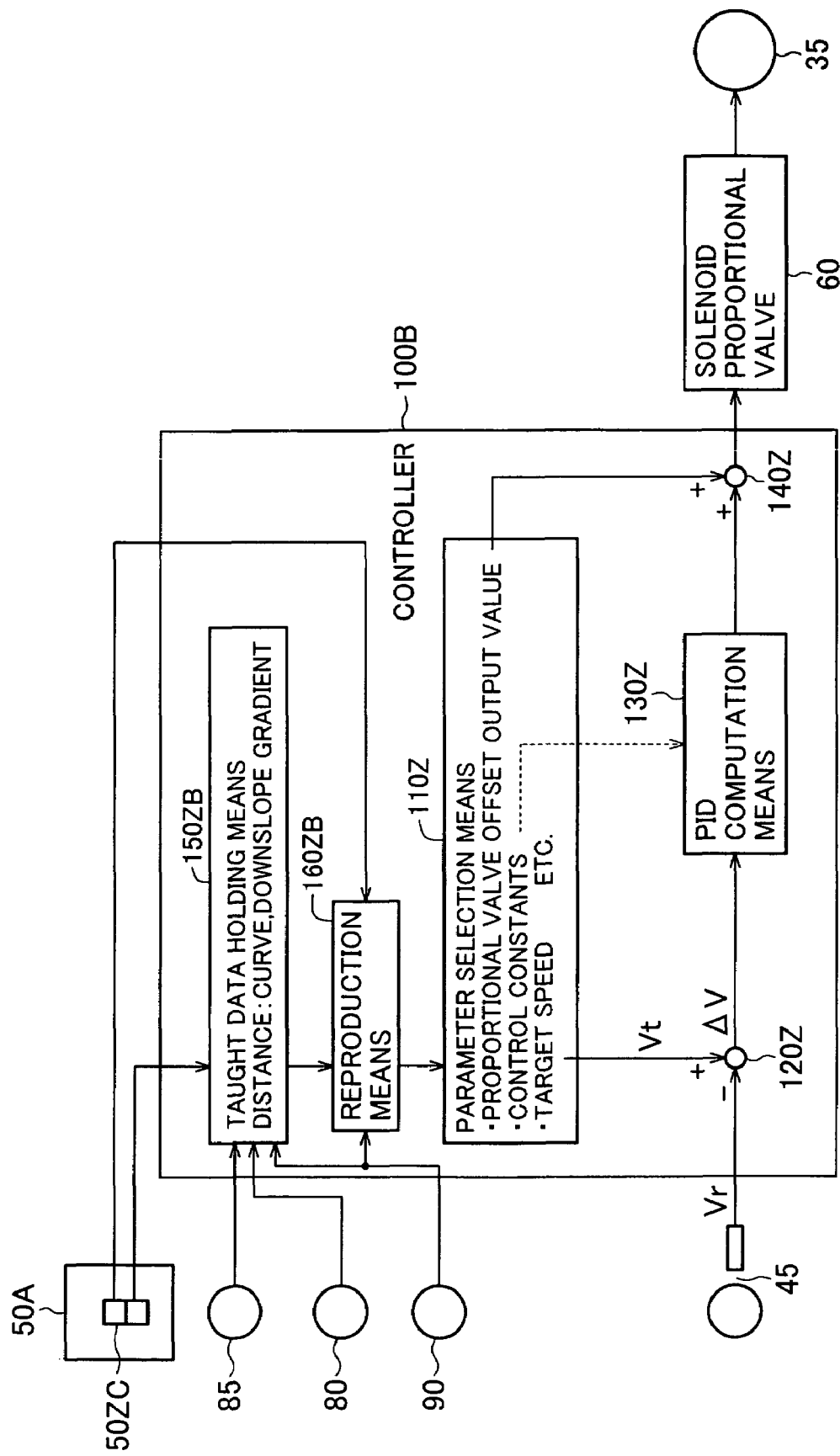
FIG. 18 is a system block diagram showing the configuration of the downhill speed control system according to the sixth embodiment of the present invention.

FIG. 17 is a block diagram showing the system configuration of a dump truck employing the downhill speed control system according to this embodiment. The same symbols as those in FIG. 14 denote the same components. This sixth embodiment differs from the embodiment shown in FIG. 14 in that the former includes a global coordinate position sensor 90, such as a GPS, instead of the distance sensor 75 shown in FIG. 14. As in the embodiment shown in FIG. 14, a setting unit 50A includes only a teaching/-reproduction selection switch 50ZC. FIG. 18 is a system block diagram showing the configuration of the downhill speed control system according to this embodiment.

A controller 100B comprises a parameter selection means 110Z, a subtraction means 120Z, a PID control means 130Z, an addition means 140Z, a taught data holding means 150ZB, and a reproduction means 160ZB.

This sixth embodiment differs from the embodiment shown in FIG. 14 in a manner of obtaining position information. This differing point will be described below. When the teaching/reproduction selection switch 50ZC is operated into a teaching state, data of the downslope gradient angle detected by the downslope inclinometer 80 and data of the steering angle detected by the steering angle sensor 85 are held in the taught data holding means 150ZB in the controller 100 in sync with information regarding the position in the course of a downward slope, which is detected by the global coordinate position sensor 90. In the teaching operation, the operator of the dump truck operates the teaching/reproduction selection switch 50ZC into the teaching state, for example, at the start point of the downward slope. Then, as the vehicle starts to run down the slope, the downslope gradient angle data detected by the downslope inclinometer 80 and the steering angle data detected by the steering angle sensor 85 are held in the holding means 150ZB in sync with the information regarding the position in the course of the downward slope, which is detected by the global coordinate position sensor 90.

When the teaching/reproduction selection switch 50ZC is operated into a reproduction state, the downslope gradient angle data detected by the downslope inclinometer 80 and the steering angle data detected by the steering angle sensor 85 are read by the reproduction means 160ZB out of the taught data holding means 150ZB in the controller 100 in sync with the information regarding the position in the course of the downward slope, which is detected by the global coordinate position sensor 90. In accordance with the read data, the parameter selection means 110Z, the subtraction means 120Z, the PID control means 130Z, and the addition means 140Z operate to output a control value Fb to the solenoid proportional valve 60, in a similar manner to that described above in connection with FIG. 14, thereby controlling the braking force produced by the retarder brake 35.

Thus, the downslope gradient angle data detected by the downslope inclinometer 80 and the steering angle data detected by the steering angle sensor 85 are held in advance in the holding means 150ZB in sync with the information regarding the position in the course of the downward slope, which is detected by the global coordinate position sensor 90. In the reproduction mode, based on the steering angle and the downslope gradient angle both read out by the reproduction means 160ZB in sync with the information regarding the position in the course of the downward slope, which is detected by the global coordinate position sensor 90, the target speed, the control constants, the proportional valve offset output value, etc. are set corresponding to the condition of the downward slope at that time and the retarder brakes 35 are controlled so that the target speed corresponding to the previously taught condition of the downward slope is obtained. Hence, the target speed can be easily set only with the teaching operation made by the operator of the dump truck. Further, in this embodiment, since the target speed can be set before entering the downward slope with the operation made by the operator, the control system can be avoided from coming into a control disable state.

In addition, the operator of the dump truck can easily teach the condition of the downward slope just by setting the teaching/reproduction selection switch to the teaching side.

Processing of the teaching operation executed in the controller 100B will be described below with reference to FIG. 19. The processing of the teaching operation is executed when the teaching/reproduction selection switch 50ZC is operated into the teaching operation side.

Figure 19:
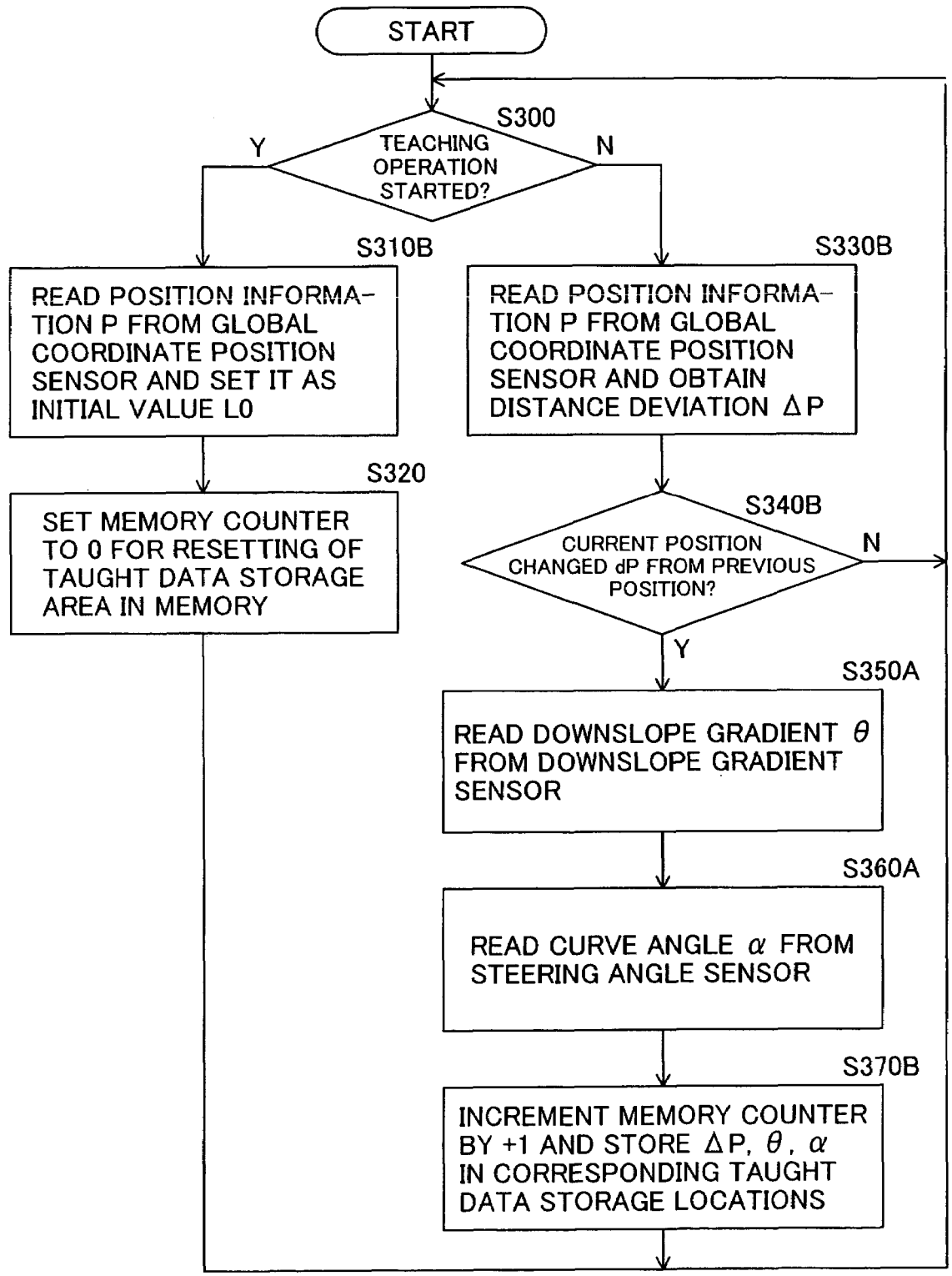
FIG. 19 is a flowchart showing details of processing executed in a teaching operation mode according to the sixth embodiment of the present invention.

Processing procedures shown in FIG. 19 are basically the same as those of the teaching operation shown in FIG. 16 except for processing of steps S310B, S330B, S340B and S370B. More specifically, if it is determined in step S300 that the teaching operation is to be started, the controller reads position information P from the global coordinate position sensor 90 and sets it as an initial value P0 in the taught data holding means 150ZB (step S310B).

After the initialization, the controller reads the position information P from the global coordinate position sensor 90 and obtains a distance difference ΔP=P−P0 (step S330B). It then determines whether the current position has changed dP from the previous position (step S340B), followed by proceeding to step S350 if changed, or returning to step S300 if not changed.

Further, in step S370B, the memory counter is incremented by +1, and the distance difference ΔP, the downslope gradient angle θ, and the steering angle α are stored in the corresponding taught data storage area of the memory in the taught data holding means 150ZB (step S370B).

Processing of the reproduction operation executed in the controller 100B will be described below with reference to FIG. 20. The processing of the reproduction operation is executed when the teaching/reproduction selection switch 50ZC is operated into the reproduction operation side.

Figure 20:
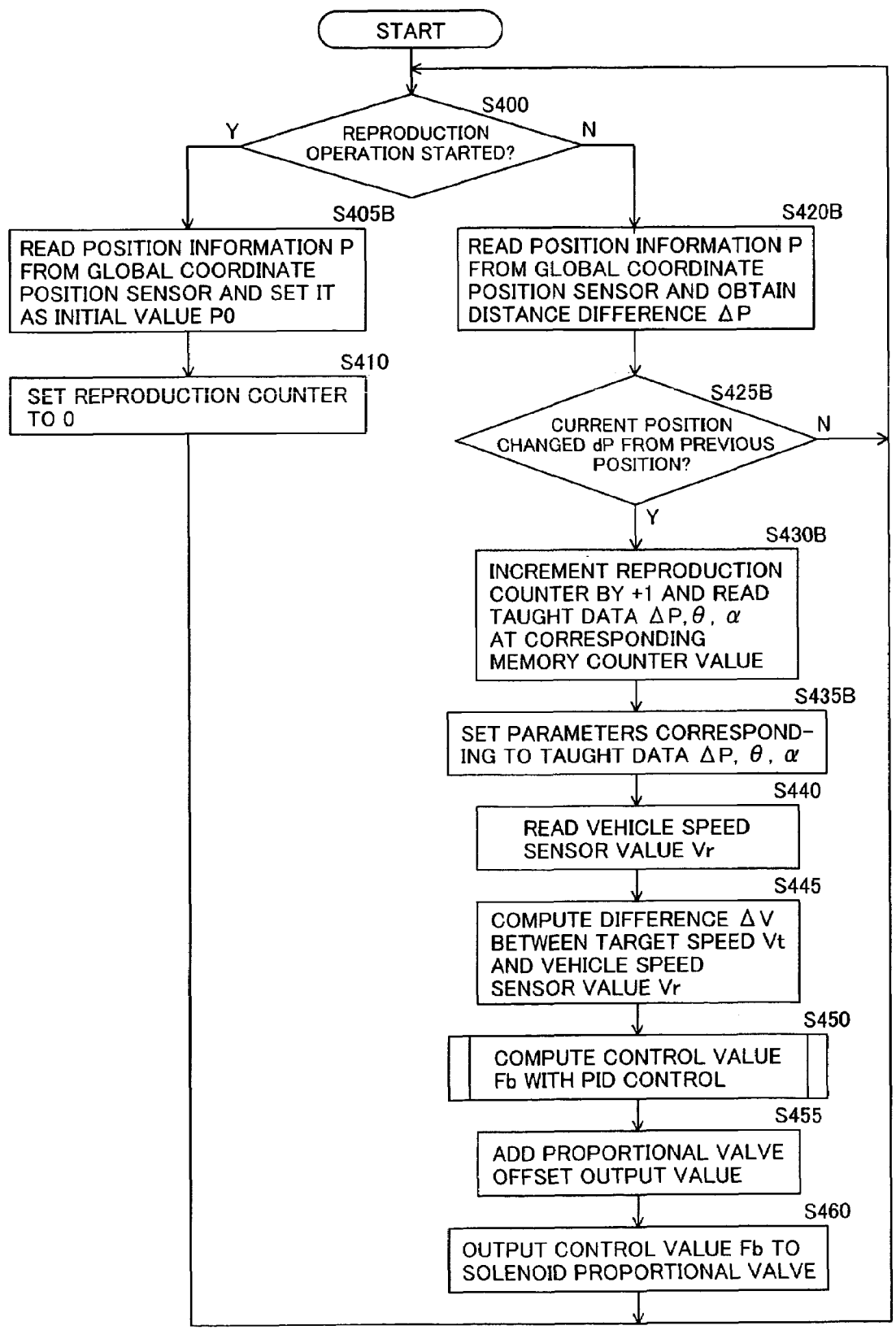
FIG. 20 is a flowchart showing details of processing executed in a reproducing operation mode according to the sixth embodiment of the present invention.

Processing procedures shown in FIG. 20 are basically the same as those of the reproduction operation shown in FIG. 16 except for processing of steps S405B, S420B, S425B, S430B and S435B. More specifically, if it is determined in step S400 that the reproduction operation is to be started, the controller reads the position information P from the global coordinate position sensor 90 and sets it as the initial value P0 in the taught data holding means 150ZB (step S405B).

After the initialization, the controller reads the position information P from the global coordinate position sensor 90 and obtains the distance difference ΔP=P−P0 (step S420B). It then determines whether the distance difference has changed dP from the previous value (step S425B), followed by proceeding to step S430B if changed, or returning to step S400 if not changed.

Then, the reproduction means 160ZB increments the reproduction counter by +1, reads the taught data (i.e., the distance difference ΔP, the downslope gradient angle θ, and the steering angle α) out of the corresponding taught data storage area of the memory in the taught data holding means 150ZB, and outputs the read data to the parameter selection means 110Z (step S430B).

Then, the parameter selection means 110Z sets the parameters (i.e., the target speed Vt, the integral constant Ki, and the proportional valve offset value) corresponding to the taught data (i.e., the distance difference ΔP, the downslope gradient angle θ, and the steering angle α) read out by the reproduction means 160ZB (step S435B).

According to this embodiment, as described above, since the parameters are set by teaching the target speed, etc. in advance and the set parameters are read in sync with the position information in the reproduction mode to control the strength of applied brake, the control can be avoided from coming into an unstable state with frequent changes of the parameters, such as the gradient angle and the target speed value, caused depending on conditions of the vehicle body. Also, since the target speed can be set in advance before the vehicle enters a downward slope, the control system can be avoided from coming into the control disable state. It is hence possible to improve controllability while the vehicle is running down the slope.

The configuration and operation of a downhill speed control system according to a seventh embodiment of the present invention will be described below with reference to FIGS. 21 and 22. In this embodiment, the present invention is applied to a dump truck.

Figure 21:
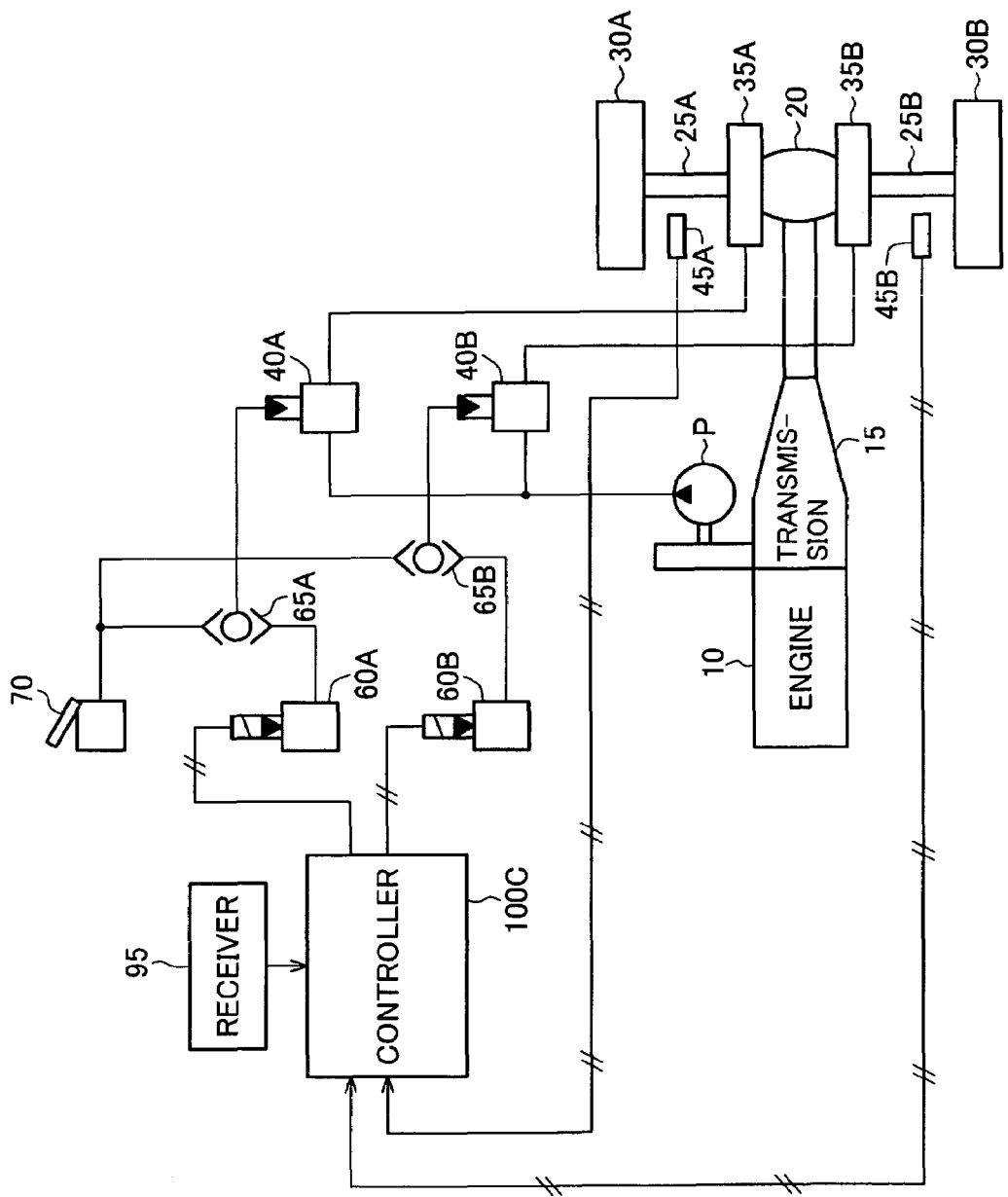
FIG. 21 is a block diagram showing the system configuration of a dump truck employing a downhill speed control system according to a seventh embodiment of the present invention.

FIG. 21 is a block diagram showing the system configuration of a dump truck employing the downhill speed control system according to this embodiment. The same symbols as those in FIG. 10 denote the same components. This seventh embodiment differs from the embodiment shown in FIG. 10 in that the former includes a receiver 95 instead of the setting unit 50 and the distance sensor 75 both shown in FIG. 10.

Figure 22:
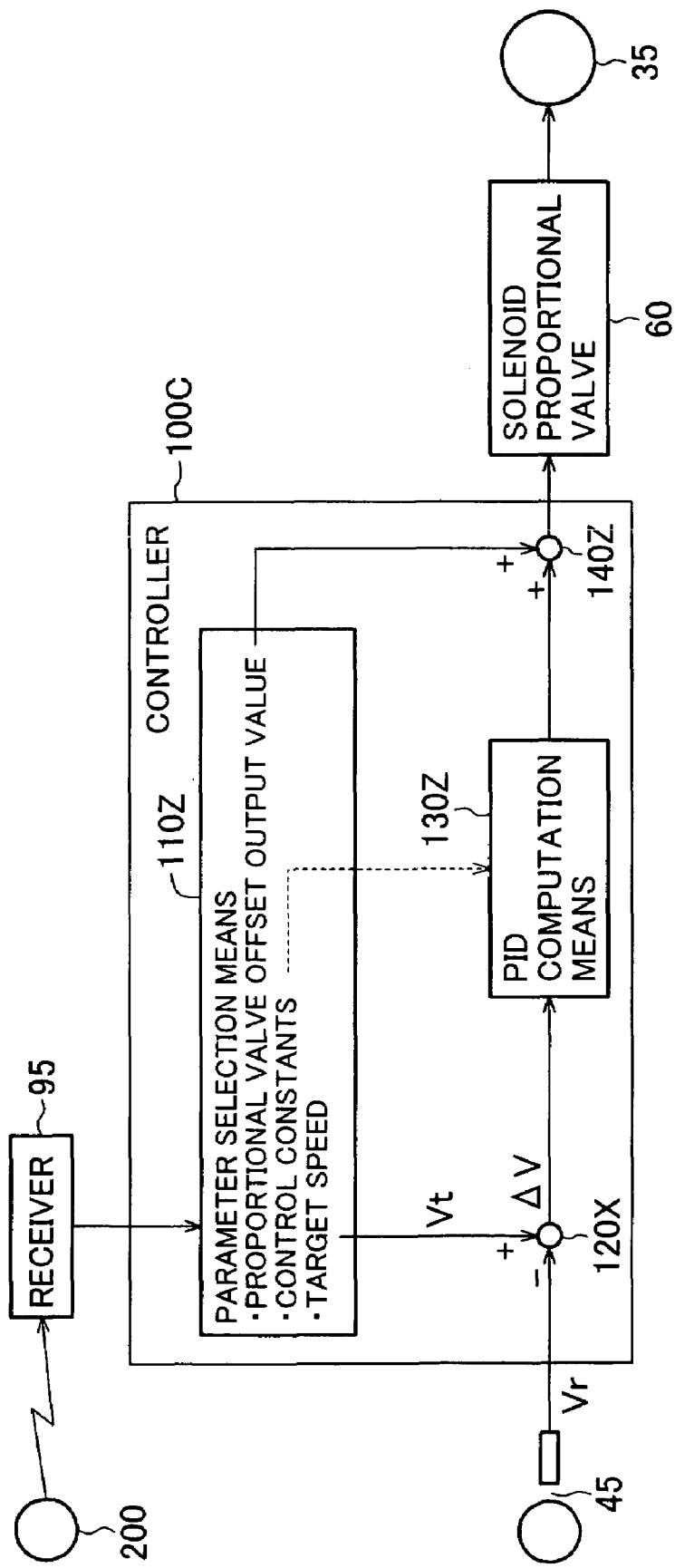
FIG. 22 is a system block diagram showing the configuration of the downhill speed control system according to the seventh embodiment of the present invention.

FIG. 22 is a system block diagram showing the configuration of the downhill speed control system according to this embodiment.

A controller 100C comprises a parameter selection means 110Z, a subtraction means 120Z, a PID control means 130Z, and an addition means 140Z. The receiver 95 receives, from a road marker 200, information regarding the steering angle and the gradient angle of a downward slope. Midway the downward slope, the road marker 200 is installed in each position where road conditions (i.e., the steering angle and the gradient angle) are changed.

Depending on the road conditions (i.e., the steering angle and the gradient angle) received by the receiver 200 from the road marker 200 installed midway the downward slope, the controller 100C controls operations of the parameter selection means 110Z, the subtraction means 120Z, the PID control means 130Z, and the addition means 140Z to output a control value Fb to the solenoid proportional valve 60, in a similar manner to that described above in connection with FIG. 14, thereby controlling the braking force produced by the retarder brake 35.

According to this embodiment, as described above, since the strength of applied brake is controlled depending on the road conditions obtained from the road marker, the control can be avoided from coming into an unstable state with frequent changes of the parameters, such as the gradient angle and the target speed value, caused depending on conditions of the vehicle body. It is hence possible to improve controllability while the vehicle is running down the slope.

INDUSTRIAL APPLICABILITY

By employing the method of setting a target speed in advance, the present invention is able to improve not only controllability when a vehicle runs down a slope, but also operability in setting of the target speed by an operator.

The invention claimed is:

1. A downhill speed control system having control means for controlling the strength of applied brake to make an actual vehicle speed matched with a target speed when a vehicle runs down a slope, wherein:
   the control system includes target speed setting means capable of setting the target speed,
   said control means controls the strength of applied brake so that an actual vehicle speed is matched with a target speed set by said target speed setting means, and
   said target speed setting means includes a setting selection switch capable of selecting a plurality of target speeds set in advance.

2. A downhill speed control system according to claim 1, wherein:
   said target speed setting means includes an up/down switch capable of increasing and decreasing the target speed indicated on a display.

3. A downhill speed control system according to claim 1, wherein:
   said control means monitors a step-down amount of an accelerator pedal and starts control of the strength of the applied brake when the step-down amount becomes zero.

4. A downhill speed control system according to claim 1, further comprising:
   downslope gradient angle setting means capable of changeably setting a gradient angle of a downward slope,
   wherein said control means modifies at least one control constant for control, which is executed on a difference between the target speed and the actual speed, depending on the gradient angle set by said downslope gradient angle setting means, thereby controlling the strength of the applied brake.

5. A downhill speed control system according to claim 4, wherein:
   said control means adds an offset output value, which is supplied to a solenoid proportional valve for driving each brake, to a value computed with said control, depending on the gradient angle set by said downslope gradient angle setting means, thereby controlling the strength of the applied brake.

6. A downhill speed control system according to claim 1, further comprising:
   load setting means capable of changeably setting a load carried on a vehicle,
   wherein said control means modifies at least one control constant for control, which is executed on a difference between the target speed and the actual speed, depending on the load set by said load setting means, thereby controlling the strength of the applied brake.

7. A downhill speed control system according to claim 6, wherein:
   said control means adds the offset output value, which is supplied to the solenoid proportional valve for driving each brake, to a value computed with said control, depending on the load set by said load setting means (50XC), thereby controlling the strength of the applied brake.

8. A downhill speed control system according to claim 1, wherein:
   said control means computes an acceleration based on the actual vehicle speed, and performs control to increase the strength of the applied brake when the computed acceleration is larger than a target acceleration set in advance.

9. A downhill speed control system according to claim 8, wherein:
   said control means has means for executing controls including proportional control to control the strength of the applied brake depending on a difference between the actual vehicle speed and the target speed when said vehicle runs down the slope, and
   a proportional constant for use in the proportional control executed by said control means is increased when the computed acceleration is larger than the target acceleration set in advance.

10. A downhill speed control system according to claim 1, wherein:
    said control means sets control parameters corresponding to a previously taught condition of a downward slope and controls the strength of the applied brake in accordance with the set control parameters.

11. A downhill speed control system according to claim 10, further comprising:
    a setting unit for setting the condition of the downward slope, and
    a distance sensor for detecting the distance from a slope start point of the downward slope,
    wherein said control means holds the condition of the downward slope, which has been set and taught by said setting unit in advance, in correspondence with the distance from the slope start point detected by said distance sensor, and while reproducing the condition of the downward slope held in correspondence with the distance from the slope start point detected by said distance sensor, said control means sets the control parameters corresponding to the reproduced condition of the downward slope, thereby controlling the strength of the applied brake in accordance with the set control parameters.

12. A downhill speed control system according to claim 10, further comprising:
    a condition detecting sensor for detecting the condition of the downward slope, and
    a distance sensor for detecting the distance from a slope start point of the downward slope, wherein said control means holds the condition of the downward slope, which has been set and taught by said condition detecting sensor in advance, in correspondence with the distance from the slope start point detected by said distance sensor, and while reproducing the condition of the downward slope held in correspondence with the distance from the slope start point detected by said distance sensor, said control means sets the control parameters corresponding to the reproduced condition of the downward slope, thereby controlling the strength of the applied brake in accordance with the set control parameters.

13. A downhill speed control system according to claim 10, further comprising:
   a condition detecting sensor for detecting the condition of the downward slope, and
   a position sensor for detecting a position in the course of the downward slope,
   wherein said control means holds the condition of the downward slope, which has been set and taught by said condition detecting sensor in advance, in correspondence with the position in the course of the downward slope detected by said position sensor, and while reproducing the condition of the downward slope held in correspondence with the position in the course of the downward slope detected by said position sensor, said control means sets the control parameters corresponding to the reproduced condition of the downward slope, thereby controlling the strength of the applied brake in accordance with the set control parameters.

14. A downhill speed control system according to claim 10, further comprising:
   a receiver for receiving the condition of the downward slope from a road marker which transmits the condition of the downward slope,
   wherein said control means receives, by said receiver, the condition of the downward slope, which has been set and taught in said road marker in advance, and sets the control parameters corresponding to the received condition of the downward slope, thereby controlling the strength of the applied brake in accordance with the set control parameters.

15. A downhill speed control system according to claim 10, wherein:
   the condition of the downward slope is a steering angle in the downward slope, and
   said control means sets the target speed as one of the control parameters corresponding to the steering angle in the downward slope, thereby controlling the strength of the applied brake so that a downhill speed is matched with the set target speed.

16. A downhill speed control system according to claim 10, wherein:
   the condition of the downward slope is a gradient angle of the downward slope, and
   said control means sets a control constant as one of the control parameters corresponding to the gradient angle of the downward slope, thereby controlling the strength of the applied brake.

17. A downhill speed control system according to claim 10, wherein:
   the condition of the downward slope is a gradient angle of the downward slope, and
   said control means sets an offset output value for a proportional valve, as one of the control parameters, corresponding to the gradient angle of the downward slope, thereby controlling the strength of the applied brake.

18. A downhill speed control system having control means for controlling the strength of applied brake to make an actual vehicle speed matched with a target speed when a vehicle runs down a slope, wherein:
   the control system includes target speed setting means capable of setting the target speed,
   said control means controls the strength of applied brake so that an actual vehicle speed is matched with a target speed set by said target speed setting means, and
   said target speed setting means includes a setting speed switch capable of setting the target speed in a continuous way.

19. A downhill speed control system having control means for controlling the strength of applied brake to make an actual vehicle speed matched with a target speed when a vehicle runs down a slope, wherein:
   said control means sets control parameters corresponding to a previously taught condition of a downward slope, and controls the strength of applied brake in accordance with the set control parameters.

20. A downhill speed control system according to claim 19, further comprising:
   a setting unit for setting the condition of the downward slope, and
   a distance sensor for detecting the distance from a slope start point of the downward slope,
   wherein said control means holds the condition of the downward slope, which has been set and taught by said setting unit in advance, in correspondence with the distance from the slope start point detected by said distance sensor, and while reproducing the condition of the downward slope held in correspondence with the distance from the slope start point detected by said distance sensor, said control means sets the control parameters corresponding to the reproduced condition of the downward slope, thereby controlling the strength of the applied brake in accordance with the set control parameters.

21. A downhill speed control system according to claim 19, further comprising:
   a condition detecting sensor for detecting the condition of the downward slope, and
   a distance sensor for detecting the distance from a slope start point of the downward slope,
   wherein said control means holds the condition of the downward slope, which has been set and taught by said condition detecting sensor in advance, in correspondence with the distance from the slope start point detected by said distance sensor, and while reproducing the condition of the downward slope held in correspondence with the distance from the slope start point detected by said distance sensor, said control means sets the control parameters corresponding to the reproduced condition of the downward slope, thereby controlling the strength of the applied brake in accordance with the set control parameters.

22. A downhill speed control system according to claim 19, further comprising:
   a condition detecting sensor for detecting the condition of the downward slope, and
   a position sensor for detecting a position in the course of the downward slope,
   wherein said control means holds the condition of the downward slope, which has been set and taught by said condition detecting sensor in advance, in correspondence with the position in the course of the downward slope detected by said position sensor, and while reproducing the condition of the downward slope held in correspondence with the position in the course of the downward slope detected by said position sensor, said control means sets the control parameters corresponding to the reproduced condition of the downward slope, thereby controlling the strength of the applied brake in accordance with the set control parameters.

23. A downhill speed control system according to claim 19, further comprising:
a receiver for receiving the condition of the downward slope from a road marker which transmits the condition of the downward slope,
wherein said control means receives, by said receiver, the condition of the downward slope, which has been set and taught in said road marker in advance, and sets the control parameters corresponding to the received condition of the downward slope, thereby controlling the strength of the applied brake in accordance with the set control parameters.

24. A downhill speed control system according to claim 19, wherein:
the condition of the downward slope is a steering angle in the downward slope, and
said control means sets the target speed as one of the control parameters corresponding to the steering angle in the downward slope, thereby controlling the strength of the applied brake so that a downhill speed is matched with the set target speed.

25. A downhill speed control system according to claim 19, wherein:
the condition of the downward slope is a gradient angle of the downward slope, and
said control means sets a control constant as one of the control parameters corresponding to the gradient angle of the downward slope, thereby controlling the strength of the applied brake.

26. A downhill speed control system according to claim 19, wherein:
the condition of the downward slope is a gradient angle of the downward slope, and said control means sets an offset output value for a proportional valve, as one of the control parameters, corresponding to the gradient angle of the downward slope, thereby controlling the strength of the applied brake.

* * * * *